United States Patent
Choi et al.

(10) Patent No.: US 11,121,786 B2
(45) Date of Patent: Sep. 14, 2021

(54) METHOD AND APPARATUS FOR MEASURING INTERFERENCE IN WIRELESS COMMUNICATION SYSTEM

(71) Applicant: Samsung Electronics Co., Ltd., Suwon-si (KR)

(72) Inventors: Seunghoon Choi, Suwon-si (KR); Jinkyu Kang, Suwon-si (KR); Youngbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 16/749,361

(22) Filed: Jan. 22, 2020

(65) Prior Publication Data
US 2021/0167877 A1 Jun. 3, 2021

(30) Foreign Application Priority Data
Nov. 28, 2019 (KR) .......................... 10-2019-0155413

(51) Int. Cl.
*H04B 17/345* (2015.01)
*H04W 24/08* (2009.01)

(52) U.S. Cl.
CPC .......... *H04B 17/345* (2015.01); *H04W 24/08* (2013.01)

(58) Field of Classification Search
CPC ............................. H04B 17/345; H04W 24/08
See application file for complete search history.

(56) References Cited

U.S. PATENT DOCUMENTS

| 2014/0254537 | A1* | 9/2014 | Kim ...................... H04L 5/0053 370/329 |
| 2016/0337839 | A1 | 11/2016 | Chae et al. |
| 2018/0367346 | A1* | 12/2018 | Chen ...................... H04B 17/345 |
| 2020/0068518 | A1* | 2/2020 | Xie ...................... H04W 72/0446 |
| 2020/0169341 | A1* | 5/2020 | Hwang ................ H04B 17/345 |
| 2020/0213052 | A1* | 7/2020 | Li .......................... H04L 5/0048 |

FOREIGN PATENT DOCUMENTS

| KR | 10-2019-0129676 A | 11/2019 |
| WO | 2018/128428 A1 | 7/2018 |
| WO | 2018/228332 A1 | 12/2018 |

OTHER PUBLICATIONS

Huawei, HiSilicon, "UE-to-UE measurement for cross-link interference mitigation", 3GPP TSG RAN WG1 Meeting #90, R1-1712178, Prague, Czech Republic, Aug. 12, 2017.
(Continued)

*Primary Examiner* — Duc C Ho
(74) *Attorney, Agent, or Firm* — Jefferson IP Law, LLP

(57) ABSTRACT

An operating method and an apparatus for measuring interference of a user equipment in a wireless communication system are provided. The operating method includes receiving configuration information for interference measurement, from a base station of a serving cell, detecting a downlink reception timing based on a downlink signal received from the base station, determining an interference measurement timing based on the downlink reception timing and a timing advance (TA) offset of the serving cell, and performing interference measurement according to the configuration information at the determined interference measurement timing.

23 Claims, 24 Drawing Sheets

(56) References Cited

OTHER PUBLICATIONS

Huawei, HiSilicon, "Physical layer design for NR IAB", 3GPP TSG RAN WG1 Meeting #94bis, R1-1810130, Chengdu, China, Sep. 29, 2018.
International Search Report dated Aug. 24, 2020, issued in International Application No. PCT/KR2020/001026.
Written Opinion dated Aug. 24, 2020, issued in International Application No. PCT/KR2020/001026.

* cited by examiner

METHOD AND APPARATUS FOR MEASURING INTERFERENCE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0155413, filed on Nov. 28, 2019, in the Korean Intellectual Property Office, the disclosure of which is incorporated by reference herein in its entirety.

BACKGROUND

1. Field

The disclosure relates to a method and an apparatus for measuring interference affecting reception of data by a user equipment in a wireless communication system.

2. Description of Related Art

In order to meet wireless data traffic demands that have increased after 4th Generation (4G) communication system commercialization, efforts to develop an improved $5^{th}$ Generation (5G) communication system or a pre-5G communication system have been made. For this reason, the 5G communication system or the pre-5G communication system is called a beyond 4G network communication system or a post Long Term Evolution (LTE) system.

In order to achieve a high data transmission rate, an implementation of the 5G communication system in a millimeter Wave (mmWave) band (e.g., 60 gigahertz (GHz) band) is being considered. In the 5G communication system, technologies such as beamforming, massive Multi-Input Multi-Output (MIMO), Full Dimensional MIMO (FD-MIMO), array antenna, analog beam-forming, and large scale antenna are discussed to mitigate a propagation path loss in the mmWave band and increase propagation transmission distance.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation have been developed to improve the system network in the 5G communication system.

The 5G system has developed Advanced Coding Modulation (ACM) schemes such as Hybrid Frequency Shift Keying (FSK) and Quadrature Amplitude Modulation (QAM) (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

New standard technologies, such as 5G or New Radio (NR), may be designed to support duplex flexibility between Frequency Division Duplex (FDD) and Time Division Duplex (TDD). When a system is designed to employ a dynamic TDD scheme, a resource is dynamically allocated to each cell in a multi-cell environment, and thus interference between an Uplink (UL) and a Downlink (DL) may occur. In order to reduce this interference, it is necessary to accurately measure the interference. Therefore, in a wireless communication system, there is a need for technology for more accurately measuring interference affecting reception of data by a user equipment.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for more accurately measuring interference affecting reception of data by a user equipment in a wireless communication system.

Another aspect of the disclosure is to provide a method and an apparatus for determining a timing of measurement of interference by a user equipment in a wireless communication system.

Another aspect of the disclosure is to provide a method and an apparatus for determining an interference measurement timing of a user equipment by applying a Timing Advance (TA) offset to a downlink reception timing or a downlink transmission timing.

Another aspect of the disclosure is to provide a method and an apparatus for determining an interference measurement timing of a user equipment by adjusting a downlink reception timing based on a TA offset.

Another aspect of the disclosure is to provide a method and an apparatus for determining an interference measurement timing of a user equipment by adjusting a downlink reception timing based on a TA offset and a timing adjustment value.

Another aspect of the disclosure is to provide a method and an apparatus for determining an interference measurement timing of a user equipment by adjusting a downlink transmission timing based on a TA offset.

Another aspect of the disclosure is to provide a method and an apparatus for determining an interference measurement timing of a user equipment by adjusting a downlink transmission timing based on a TA offset and a timing adjustment value.

Additional aspects will be set forth in part in the description which follows and, in part, will be apparent from the description, or may be learned by practice of the presented embodiments.

In accordance with an aspect of the disclosure, an operating method of a user equipment in a wireless communication system is provided. The operating method includes receiving configuration information for interference measurement, from a base station of a serving cell, detecting a downlink reception timing based on a downlink signal received from the base station, determining an interference measurement timing based on the downlink reception timing and a Timing Advance (TA) offset of the serving cell, and performing interference measurement according to the configuration information at the determined interference measurement timing.

In accordance with another aspect of the disclosure, an apparatus of a user equipment in a wireless communication system is provided. The apparatus includes a receiver configured to receive configuration information for interference measurement, from a base station of a serving cell, and a processor configured to detect a downlink reception timing based on a downlink signal received from the base station, determine an interference measurement timing based on the downlink reception timing and a Timing Advance (TA) offset of the serving cell, and perform interference measurement according to the configuration information at the determined interference measurement timing.

According to various embodiments of the disclosure, in order to measure interference affecting reception of data by a user equipment, a reception timing of a downlink signal can be more accurately determined. An operation of a user equipment for reducing a time difference during measurement of an uplink reference signal is provided so that the user equipment can accurately measure the uplink reference signal, and when the user equipment reports a result of the interference measurement to a base station, the base station performs scheduling for avoiding interference to reception of downlink data by the user equipment, based on the result of the interference measurement, and thus can improve a downlink data transfer rate.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
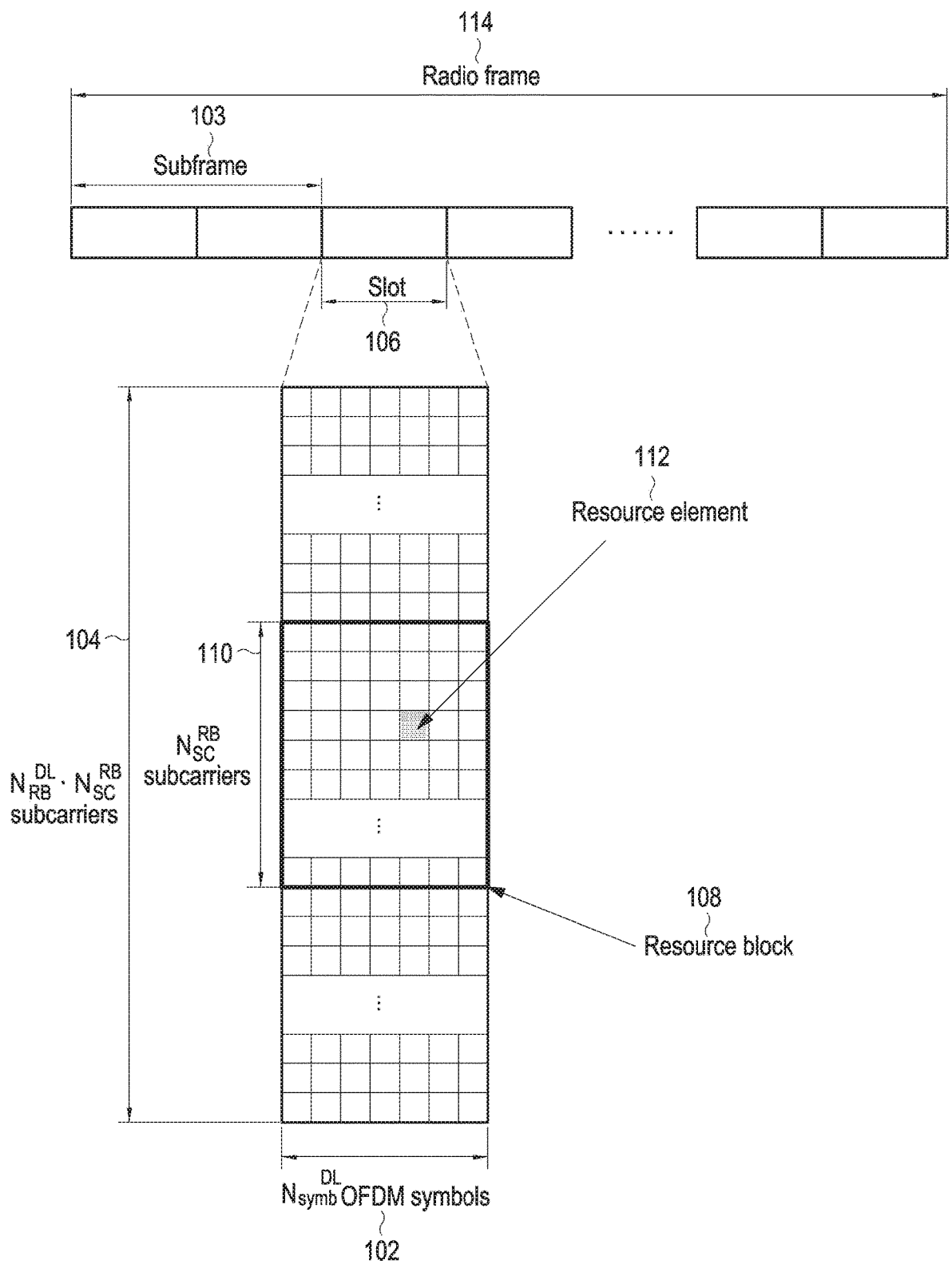
FIG. 1 is a diagram illustrating a DL resource grid in a time-frequency domain in an LTE/LTE-Advanced (LTE-A) system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments, a detailed description of related functions or configurations will be omitted when it is determined that the detailed description thereof may unnecessarily obscure the subject matter of the disclosure. The terms as described below are defined in consideration of the functions in the embodiments, and the meaning of the terms may vary according to the intention of a user or operator, convention, or the like. Therefore, the definitions of the terms should be made based on the contents throughout the specification.

For the same reasons, some elements may be exaggerated, omitted, or schematically illustrated in the accompanying drawings. Further, the size of each element does not entirely reflect the actual size. In the drawings, identical or corresponding elements are provided with identical reference numerals.

The advantages and features of the disclosure and methods of achieving the same will be apparent by referring to embodiments of the disclosure as described below in detail in conjunction with the accompanying drawings. However, the disclosure is not limited to the embodiments disclosed below, but may be implemented in various different forms. The embodiments are provided only to make a description of the disclosure complete and fully provide notification of the category of the disclosure to those having ordinary knowledge in the technical field to which the embodiments pertain, and the disclosure is only defined within the scope of the appended claims.

It will be understood that combinations of blocks in flowcharts or process flow diagrams may be performed by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit or part" used in the disclosure means a software element or a hardware element such as a Field-Programmable Gate Array (FPGA) or an Application-Specific Integrated Circuit (ASIC), and the "~unit" may be configured to perform particular roles. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more Central Processing Units (CPUs) within a device or a security multimedia card.

In describing the embodiments of the disclosure in detail, although a particular wireless communication system will be the primary target, it is to be understood that the subject matter to be claimed herein may be applied to other communication systems and services having similar technical backgrounds without departing from the scope of the disclosure herein, and this will be possible at the discretion of the person skilled in the art.

In the disclosure, a Base Station (BS) is a main agent performing scheduling and resource allocation for a terminal, and may be at least one of a Node B (NB), an eNode B (eNB), a New Radio (NR) Node B (gNB), a wireless access unit, a base station controller, or a node on a network. A terminal may include a User Equipment (UE), a Mobile Station (MS), a cellular phone, a smart phone, a computer, or a multimedia system capable of performing a communication function, and will hereinafter be referred to as a user equipment. In the disclosure, a Downlink (DL) means a radio transmission path of a signal transmitted from a BS to a user equipment, and an Uplink (UL) means a radio transmission path of a signal transmitted from the user equipment to the BS.

Hereinafter, in various embodiments of the disclosure, an LTE or LTE-Advanced (LTE-A) system will be described by way of example, but the embodiments may also be applied to other communication systems having similar technical backgrounds or channel forms. For example, a fifth Generation (5G) mobile communication technology (e.g., NR) to be developed subsequent to the LTE-A may be included in other communication systems. According to the determination of those skilled in the art, embodiments may also be applied to other communication systems through partial modification without largely departing from the scope of the disclosure.

The terms "physical channel" and "signal" in the LTE or LTE-A system may be used to describe a method and an apparatus proposed in the disclosure. However, the contents of the disclosure may be applied to a wireless communication system other than the LTE and LTE-A systems.

In the disclosure, physical layer signaling is a method for delivering a signal from a BS to a user equipment by using a DL control channel of a physical layer or from the user equipment to the BS by using a UL control channel of the physical layer, and may be referred to as "L1 signaling" or "PHY signaling".

In the disclosure, higher signaling or higher layer signaling is a method for delivering a signal from a BS to a user equipment by using a DL data channel of a physical layer or from the user equipment to the BS by using a UL data channel of the physical layer, and may be referred to as "Radio Resource Control (RRC) signaling", "Layer 2 (L2) signaling", "Packet Data Convergence Protocol (PDCP) signaling", or "Media Access Control (MAC) Control Element (CE)".

A wireless communication system has been developed from a wireless communication system providing a voice-centered service in the early stage toward broadband wireless communication systems providing high-speed and high-quality packet data services compliant with communication standards, such as: High-Speed Packet Access (HSPA), Long-Term Evolution (LTE) or Evolved Universal Terrestrial Radio Access (E-UTRA), and LTE-A of 3GPP; High-Rate Packet Data (HRPD) and Ultra-Mobile Broadband (UMB) of 3GPP2; and 802.16e of the Institute of Electrical and Electronics Engineers (IEEE). The 5G or NR communication standards are being produced as the 5G wireless communication system.

As a representative example of the broadband wireless communication systems, an LTE system employs an Orthogonal Frequency Division Multiplexing (OFDM) scheme for a Downlink (DL), and employs a Single Carrier (SC)-Frequency Division Multiple Access (FDMA) scheme for an Uplink (UL). The UL refers to a wireless link for transmitting data or a control signal from a user equipment (or a Mobile Station (MS)) to a Base Station (BS) (or an evolved Node B (eNB)), and the DL refers to a wireless link for transmitting data or a control signal from the BS to the user equipment. The above-described multiple access schemes generally distinguish between data or control information of different users by allocating and operating time-frequency resources, on which data or control information of the users are to be transmitted, so as not to overlap each other, that is, to establish orthogonality therebetween.

An LTE system employs a Hybrid Automatic Repeat Request (HARQ) scheme in which a physical layer retransmits data when a decoding failure occurs in initial transmission. In the HARQ scheme, when a receiver fails to accurately decode data, the receiver transmits information (Negative ACKnowledgment (NACK)) indicating the decoding failure to the transmitter so that the transmitter may retransmit the corresponding data in the physical layer. The receiver combines the data, retransmitted by the transmitter, with the data, previous decoding of which has failed, so as to improve data reception performance. When the receiver accurately decodes the data, information (ACKnowledgment (ACK)) indicating successful decoding is transmitted to the transmitter so that the transmitter may transmit new data.

FIG. 1 is a diagram illustrating a DL resource grid in a time-frequency domain for a DL in an LTE/LTE-A system according to an embodiment of the disclosure.

Referring to FIG. 1, a horizontal axis represents a time domain and a vertical axis represents a frequency domain.

Referring to FIG. 1, in the time domain, the minimum transmission unit is an OFDM symbol, and $N_{symb}^{DL}$ OFDM symbols 102 are gathered to constitute one slot 106, and two slots are gathered to constitute one subframe 103. The length of the slot is 0.5 ms, and the length of the subframe is 0.1 ms. Further, a radio frame 114 is a time domain interval including 10 subframes. In the frequency domain, the minimum transmission unit is a subcarrier, and a transmission bandwidth of a system transmission band includes a total of $N_{RB}^{DL} \times N_{sc}^{RB}$ subcarriers 104. In this example, $N_{RB}^{DL}$ is the number of Resource Blocks (RBs) constituting a DL transmission bandwidth, and $N_{sc}^{RB}$ is the number of subcarriers constituting one RB.

In the time-frequency domain, a basic unit of a resource is a Resource Element (RE) 112, and may be indicated by an OFDM symbol index and a subcarrier index. An RB or a Physical Resource Block (PRB) 108 is defined by $N_{symb}^{DL}$ consecutive OFDM symbols 102 in the time domain and $N_{sc}^{RB}$ consecutive subcarriers 110 in the frequency domain. Accordingly, one RB 108 includes $N_{symb}^{DL} \times N_{sc}^{RB}$ REs 104. The minimum transmission unit of data or control information may be an RB. As an example, $N_{symb}^{DL}=\{7, 6, 3, 1\}$ and $N_{sc}^{RB}=\{12, 24, 144\}$. $N_{RB}^{DL}$ is proportional to a DL transmission bandwidth of the system transmission band, and a data rate increases in proportion to the number of RBs scheduled for a user equipment. In the LTE system, six transmission bandwidths are operated. In the case of a Frequency Division Duplex (FDD) system that divides and operates a DL and an UL through a frequency, a DL transmission bandwidth may be different from an UL transmission bandwidth. A channel bandwidth indicates a Radio Frequency (RF) bandwidth corresponding to the system transmission bandwidth.

Table 1 below shows a corresponding relationship between a channel bandwidth and a transmission bandwidth defined in the LTE system. For example, in the LTE system having the channel bandwidth of 10 MHz, the transmission bandwidth includes 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

DL control information is transmitted within first N OFDM symbols in a subframe. In an embodiment, N={1, 2, 3}. Accordingly, depending on the amount of control information required to be transmitted in a current subframe, a value of N may vary in every subframe. The DL control information includes a control channel transmission interval indicator indicating how many OFDM symbols the DL control information is transmitted through, scheduling allocation information for DL data or UL data, a HARQ ACK/NACK signal, and the like.

The scheduling allocation information for the DL data or the UL data is delivered from a BS to a user equipment through downlink control information (DCI). The DCI may be defined as one of various formats, and is applied as a DCI format determined depending on whether the DCI is scheduling allocation information for the UL data (i.e., UL grant)

or scheduling allocation information for the DL data (i.e., DL grant), whether the DCI is compact DCI having a small size of the control information, whether spatial multiplexing using multiple antennas is applied, whether the DCI is a DCI for power control, or the like.

For example, a DCI format 1 including the scheduling allocation information for the DL data (i.e., DL grant) may be configured to include at least the following control information fields.

Resource allocation type 0/1 flag: This notifies whether a resource allocation scheme is of type 0 or type 1. The type 0 allocates resources in the unit of Resource Block Group (RBG) by applying a bitmap scheme. In the LTE system, a basic unit of scheduling is an RB expressed as a time and frequency domain resource, and the RBG includes multiple RBs, and becomes a basic unit of scheduling in the type 0 scheme. The type 1 allocates a particular RB in the RBG.

Resource block assignment: This notifies of an RB allocated for data transmission. An expressed resource is determined according to a system bandwidth and a resource allocation scheme.

Modulation and Coding Scheme (MCS): This notifies of a modulation scheme used for data transmission and the size of a transport block which is data to be transmitted.

HARQ process number: This notifies of a process number of HARQ.

New Data Indicator (NDI): This notifies whether HARQ transmission is initial transmission or retransmission.

Redundancy Version (RV): This notifies of a redundancy version of HARQ.

Transmit Power Control (TPC) command for a Physical Uplink Control Channel (PUCCH): This notifies of a transmission power control command for a PUCCH which is an uplink control channel.

The DCI is processed by a channel coding and modulation and is transmitted through a Physical Downlink Control Channel (PDCCH) or an Enhanced PDCCH (EPDCCH).

In general, the DCI is scrambled by a particular Radio Network Temporary Identifier (RNTI) (or a UE identifier) with respect to each user equipment, is added with a Cyclic Redundancy Check (CRC), is channel-coded, and then is transmitted through an independent PDCCH. In the time domain, the PDCCH is mapped to a resource during a control channel transmission interval. A frequency-domain mapping position of the PDCCH is determined by an Identifier (ID) of each user equipment, and is propagated to the entire system transmission band.

DL data is transmitted through a Physical Downlink Shared Channel (PDSCH) which is a physical channel for DL data transmission. The PDSCH is transmitted after the control channel transmission interval, and scheduling allocation information, such as a specific mapping position in the frequency domain and a modulation scheme, is indicated by the DCI transmitted through the PDCCH.

Through an MCS including five bits among the control information constituting the DCI, the BS notifies the user equipment of a modulation scheme applied to the PDSCH to be transmitted and a Transport Block Size (TBS) representing the size of data which is to be transmitted to the user equipment. The TBS represents a size before channel coding for error correction is applied to a Transport Block (TB) including data which is to be transmitted by the BS.

The modulation schemes supported by the LTE system are Quadrature Phase Shift Keying (QPSK), 16 Quadrature Amplitude Modulation (16 QAM), and 64 QAM, and the respective modulation orders ($Q_m$) correspond to 2, 4, and 6. In the case of QPSK modulation, two bits per modulation symbol may be transmitted; in the case of 16 QAM, four bits per modulation symbol may be transmitted; and in the case of 64 QAM, six bits per modulation symbol may be transmitted.

DCI for UL data, that is, UL DCI or UL-related DCI, may include information necessary for UL transmission, such as: resource allocation type information and UL resource allocation information such as a UL grant; UL power control information; a Cyclic Shift (CS) or an Orthogonal Cover Code (OCC) of a UL reference signal; a Channel State Information (CSI) request; a Sounding Reference Signal (SRS) request; a codeword-specific Modulation and Coding Scheme (MCS) information; and a UL precoding information field.

Figure 2:
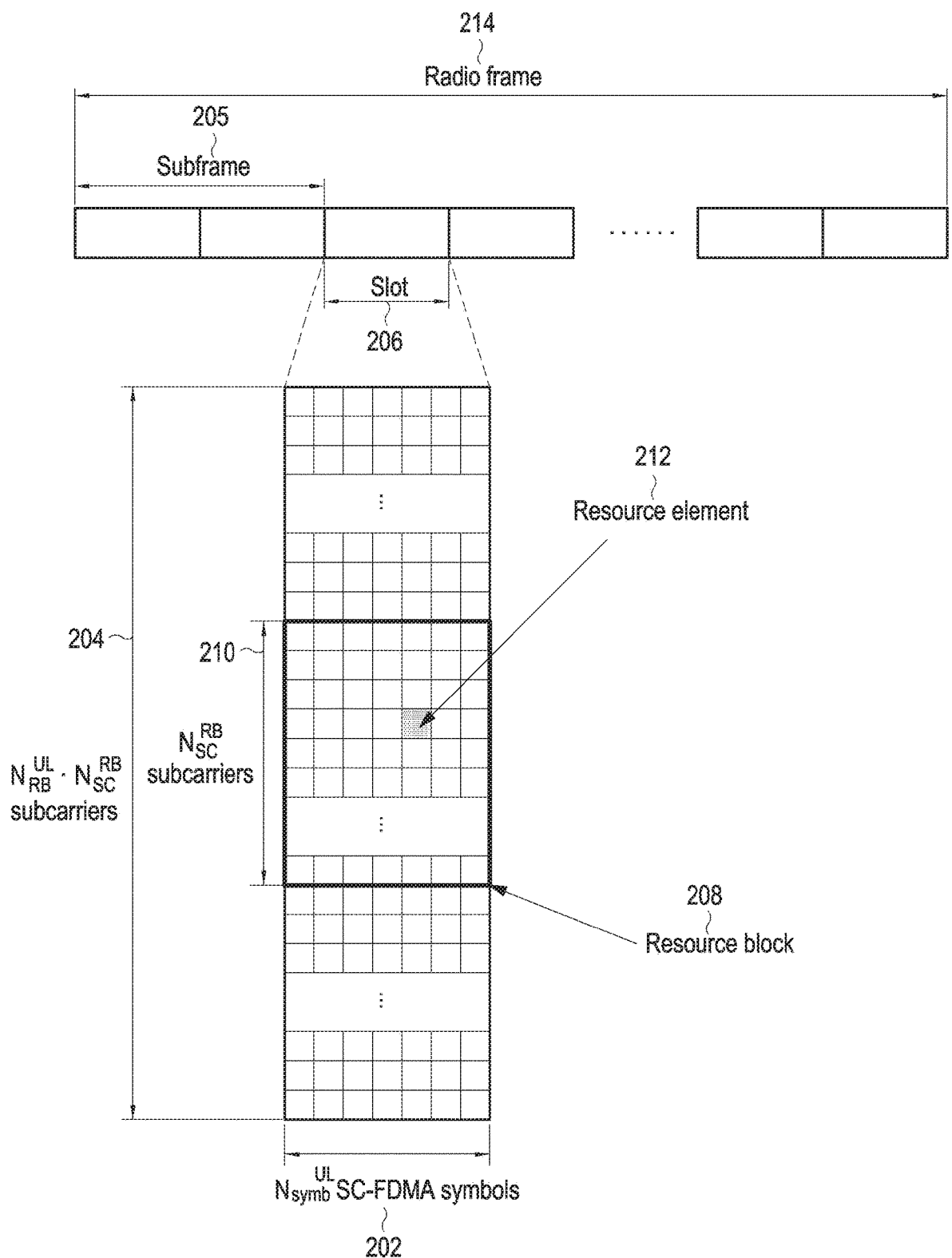
FIG. 2 is a diagram illustrating a UL resource grid in a time-frequency domain in an LTE/LTE-A system according to an embodiment of the disclosure.

FIG. 2 is a diagram illustrating a UL resource grid in a time-frequency domain in the LTE/LTE-A system according to an embodiment of the disclosure.

Referring to FIG. 2, a horizontal axis represents a time domain and a vertical axis represents a frequency domain.

Referring to FIG. 2, in the time domain, the minimum transmission unit is a Single Carrier (SC)-Frequency Division Multiple Access (SC-FDMA) symbol 202, and $N_{symb}^{UL}$ SC-FDMA symbols 202 are gathered to constitute one slot 206, and two 2 slots are gathered to constitute one subframe 205. In the frequency domain, the minimum transmission unit is a subcarrier, and a transmission bandwidth of a system transmission band includes a total of $N_{RB}^{UL} \times N_{sc}^{RB}$ subcarriers 204. In this example, $N_{RB}^{UL}$ is the number of RBs constituting a UL transmission bandwidth, and $N_{sc}^{RB}$ is the number of subcarriers constituting one RB.

In the time-frequency domain, a basic unit of a resource is a RE 212, and may be indicated by an SC-FDMA symbol index and a subcarrier index. An RB 208 is defined by $N_{symb}^{UL}$ consecutive SC-FDMA symbols 202 in the time domain and $N_{sc}^{RB}$ consecutive subcarriers 210 in the frequency domain. Accordingly, one RB 208 includes $N_{symb}^{UL} \times N_{sc}^{RB}$ REs 212. The minimum transmission unit of data or control information may be an RB. As an example, $N_{symb}^{UL} = \{7, 6\}$ and $N_{sc}^{RB} = 12$. Ala is proportional to a UL transmission bandwidth of the system transmission band. As an example, a PUCCH is mapped to a frequency domain corresponding to one RB and is transmitted in one subframe.

In the LTE system, a timing relationship is defined between a PDSCH, which is a physical channel for DL data transmission, and a PUCCH or a Physical Uplink Shared Channel (PUSCH) which is a UL physical channel for transmission of a HARQ ACK/NACK corresponding to a PDCCH/EPDDCH indicating a Semi-Persistent Scheduling release (SPS release). As an example, in the LTE system which operates in Frequency Division Duplex (FDD), the PDSCH transmitted in an (n-k)-th subframe or the HARQ ACK/NACK corresponding to the PDCCH/EPDCCH including the SPS release is transmitted through the PUCCH or PUSCH in an n-th subframe.

The LTE system employs an asynchronous HARQ scheme, in which a data retransmission time point is not fixed, for a DL. When the BS receives a feedback of HARQ NACK from the user equipment in response to the initial transmission data transmitted by the BS, the BS freely determines a transmission time of retransmission data through a scheduling operation. For a HARQ operation, the user equipment buffers data determined as an error as a result of decoding of the received data, and combines the buffered data with the next transmission data.

When the user equipment receives a PDSCH including DL data transmitted by the BS in subframe n, the user equipment transmits UL control information, which includes a HARQ ACK or NACK for the DL data, to the BS through a PUCCH or PUSCH in subframe n+k. In this example, k is defined according to a duplex mode (FDD or TDD) of the LTE system and subframe configuration of a cell thereof. As an example, in the case of an FDD LTE system, k is fixed to 4. In the case of a TDD LTE system, k may be determined according to TDD UL/DL subframe configuration and a subframe number.

The LTE system employs a synchronous HARQ scheme, in which a data retransmission time point is fixed, for a UL. A UL/DL timing relationship among a PUSCH for transmission of UL data, a PDCCH preceding the PUSCH, and a Physical Hybrid Indicator Channel (PHICH) for transmission of a DL HARQ ACK/NACK corresponding to the PUSCH is fixed according to the following rule.

When the user equipment receives a PDCCH including UL scheduling allocation information transmitted by the BS in subframe n or a PHICH for transmission of a DL HARQ ACK/NACK, the user equipment transmits UL data, which corresponds to the PDCCH or PHICH, through a PUSCH in subframe n+k. In this example, k is defined according to a duplex mode (FDD or TDD) of the LTE system and subframe configuration of a cell thereof. As an example, in the case of an FDD LTE system, k is fixed to 4. In the case of a TDD LTE system, k may be determined according to TDD UL/DL subframe configuration and a subframe number.

The user equipment may receive a PHICH, through which a DL HARQ ACK/NACK transmitted by the BS is transmitted, in subframe i. The PHICH corresponds to UL data of a PUSCH transmitted by the user equipment in subframe i-k. In this example, k is defined according to a duplex mode (FDD or TDD) of the LTE system and subframe configuration of a cell thereof. As an example, in the case of an FDD LTE system, k is fixed to 4. In the case of a TDD LTE system, k may be determined according to TDD UL/DL subframe configuration and a subframe number.

As described above, the wireless communication system has been described based on the LTE system, and the contents of the disclosure are not limited to the LTE system, but may be applied to various wireless communication systems, such as NR and 5G. For example, in NR, not only SC-FDMA but also CP OFDM may be employed for a waveform for UL transmission.

An NR system supports various slot structures in order to flexibly cope with required DL and UL capacity which varies according to an environment such as time and an operation scenario.

Figure 3:
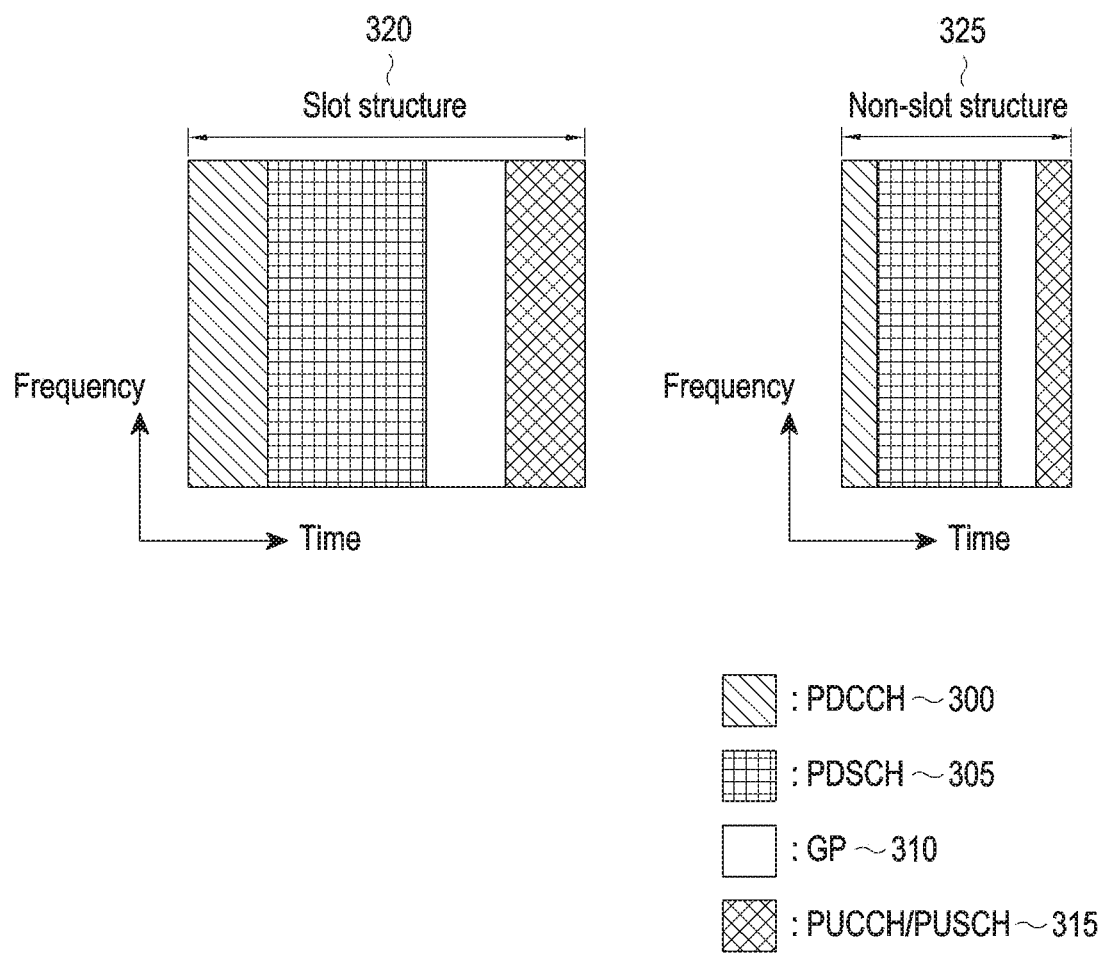
FIG. 3 is a diagram illustrating various slot structures in an NR system according to an embodiment of the disclosure.

FIG. 3 is a diagram illustrating various slot structures in an NR system according to an embodiment of the disclosure.

Referring to FIG. 3, slots having various lengths may be configured for user equipments, and a configuration value indicates at least one of a slot structure 320 including 14 (or 7) OFDM symbols or a non-slot structure 325 including 1, 2, . . . , or 7 OFDM symbols. It should be noted that the term "non-slot structure" is merely an example of the expressions and may be expressed by various terms such as "mini-slot structure" and "short-slot structure".

A frequency/time resource region unit configured in a slot structure 320 or a non-slot structure 325 may be divided, particularly from the perspective of the time axis, into a DL-only structure, a UL/DL-mixed structure (which is similar to an LTE special subframe structure), and a UL-only structure. In the disclosure, the UL/DL-mixed structure, which may be the most general structure, will be described. The DL-only structure or the UL-only structure may be considered as a special case of the UL/DL-mixed structure.

In the UL/DL-mixed structure, one slot structure 320 or one non-slot structure 325 includes at least one of a DL part, a Guard Period (GP) 310, and a UL part. The DL part may include at least one of a PDCCH 300, a PDSCH 305, and a DL Reference Signal (RS) such as a CSI-Reference Signal (CSI-RS) or a DL Demodulation Reference Signal (DL DMRS). Similarly, the UL part may include at least one of a PUCCH/PUSCH 315 and a UL RS such as an SRS or a UL DMRS. In this example, the GP 310 is a time duration for switching from DL to UL. During the GP 310, a user equipment does not need to transmit or receive data, and thus may perform operations for UL-to-DL switching, for example, Timing Alignment (TA) or RF chain switching.

Figure 4:
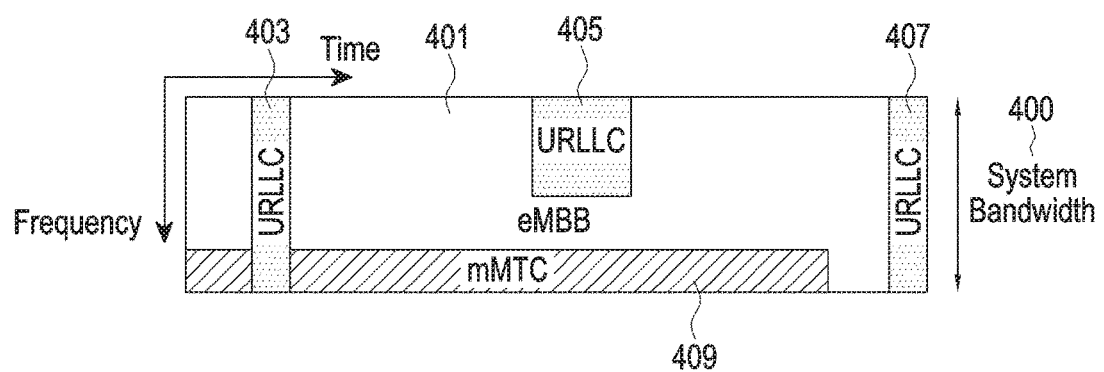
FIG. 4 is a diagram illustrating an example of a time-frequency domain frame structure for transmission of data in various service scenarios in a 5G or NR system according to an embodiment of the disclosure.
Figure 5:
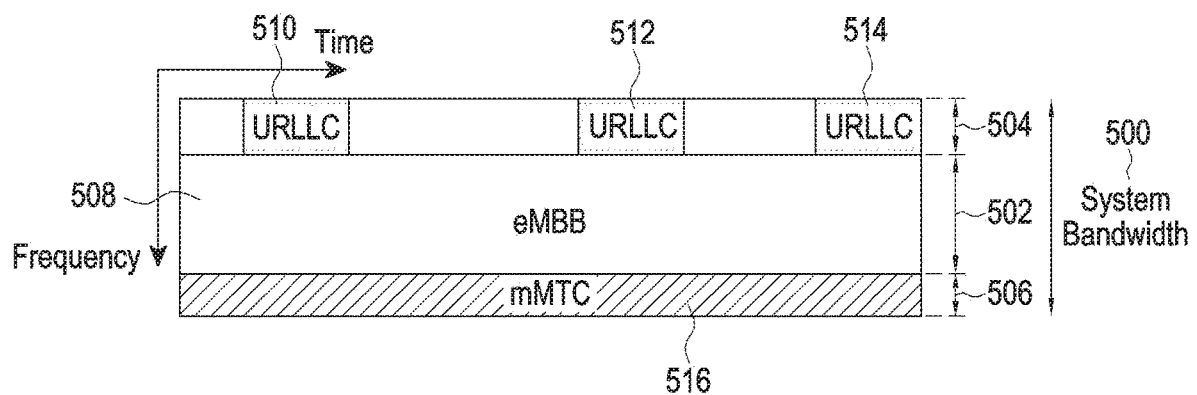
FIG. 5 is a diagram illustrating an example of a time-frequency domain frame structure for transmission of data in various service scenarios in a 5G or NR system according to an embodiment of the disclosure.

FIG. 4 is a diagram illustrating an example of a time-frequency domain frame structure for transmission of data in various service scenarios in the 5G or NR system according to an embodiment of the disclosure, and FIG. 5 is a diagram illustrating an example of a time-frequency domain frame structure for transmission of data in various service scenarios in the 5G or NR system according to an embodiment of the disclosure.

Referring to FIG. 4, data for service scenarios, such as enhanced Mobile Broadband (eMBB), Ultra-Reliable and Low-Latency Communications (URLLC), and massive Machine-Type Communications (mMTC), are allocated in an entire system bandwidth 400. When URLLC data 403, 405, and 407 required to be transmitted are generated while eMBB data 401 and mMTC data 409 are allocated and transmitted in a particular frequency bandwidth, a portion in which the eMBB data 401 and the mMTC data 409 have already been allocated, may be emptied, and the URLLC data 403, 405, and 407 may be transmitted instead. Since low latency is particularly important for URLLC among the above-described services, the URLLC data 403, 405, and 407 may be allocated a part of resources allocated to the eMBB data 401. When the URLLC data 403, 405, and 407 are allocated the part of the resources allocated to the eMBB data 401 as described above, the eMBB data 401 may not be transmitted on the frequency-time resource allocated to the URLLC data 403, 405, and 407, and thus transmission performance of the eMBB data 401 may be lowered. An eMBB transmission failure due to the above-described URLLC allocation may occur.

Referring to FIG. 5, subbands 502, 504, and 506 divided from the entire system bandwidth 500 may be used for the purpose of transmitting services and data. The subbands 502, 504, and 506 may be configured for a user equipment through higher layer signaling, or without providing subband information to the user equipment, may be obtained through optional division by a BS and be used to provide services. The subband 502 is used to transmit eMBB data 508, the subband 504 is used to transmit URLLC data 510, 512, and 514, and the subband 506 is used to transmit mMTC data 516.

Referring to FIGS. 4 and 5, the length of a Transmission Time Interval (TTI) used for URLLC transmission may be shorter than that of a TTI used for eMBB transmission or mMTC transmission.

In contrast to LTE, which is operated in the band of 6 GHz or lower, in NR an operating scenario is expected to be extended to a high-frequency band up to a maximum of 100 GHz. Since the attenuation of a channel exponentially increases according to a frequency band, there is a need for technologies for overcoming this problem in a high-frequency band.

Beamforming is a representative technology capable of efficiently overcoming attenuation in a high-frequency band without greatly increasing the number of BSs in an NR system as compared to the existing technology (LTE/LTE-A). For example, an NR system in a band of 4 to 6 GHz may support a maximum of four multi-beams so as to obtain a coverage extension of 3 dB, in order to ensure a coverage similar to that of an LTE/LTE-A system in a band of 2 to 2.5 GHz. Since a spacing between antennas necessary for beamforming is proportional to a carrier wavelength, when a frequency band becomes higher, an antenna array factor can be significantly improved. Accordingly, when a band of the NR system is higher than or equal to 6 GHz, several tens to hundreds of times of coverage extension may be obtained by utilizing several tens to hundreds of antenna elements or more. However, when the existing channel estimation and reporting, and the existing transmission mechanism are applied to the above-described large number of antenna elements, a complexity level of a user equipment/BS and a channel reporting burden may excessively increase.

The NR system considers a hybrid beamforming structure in order to solve these problems.

Figure 6A:
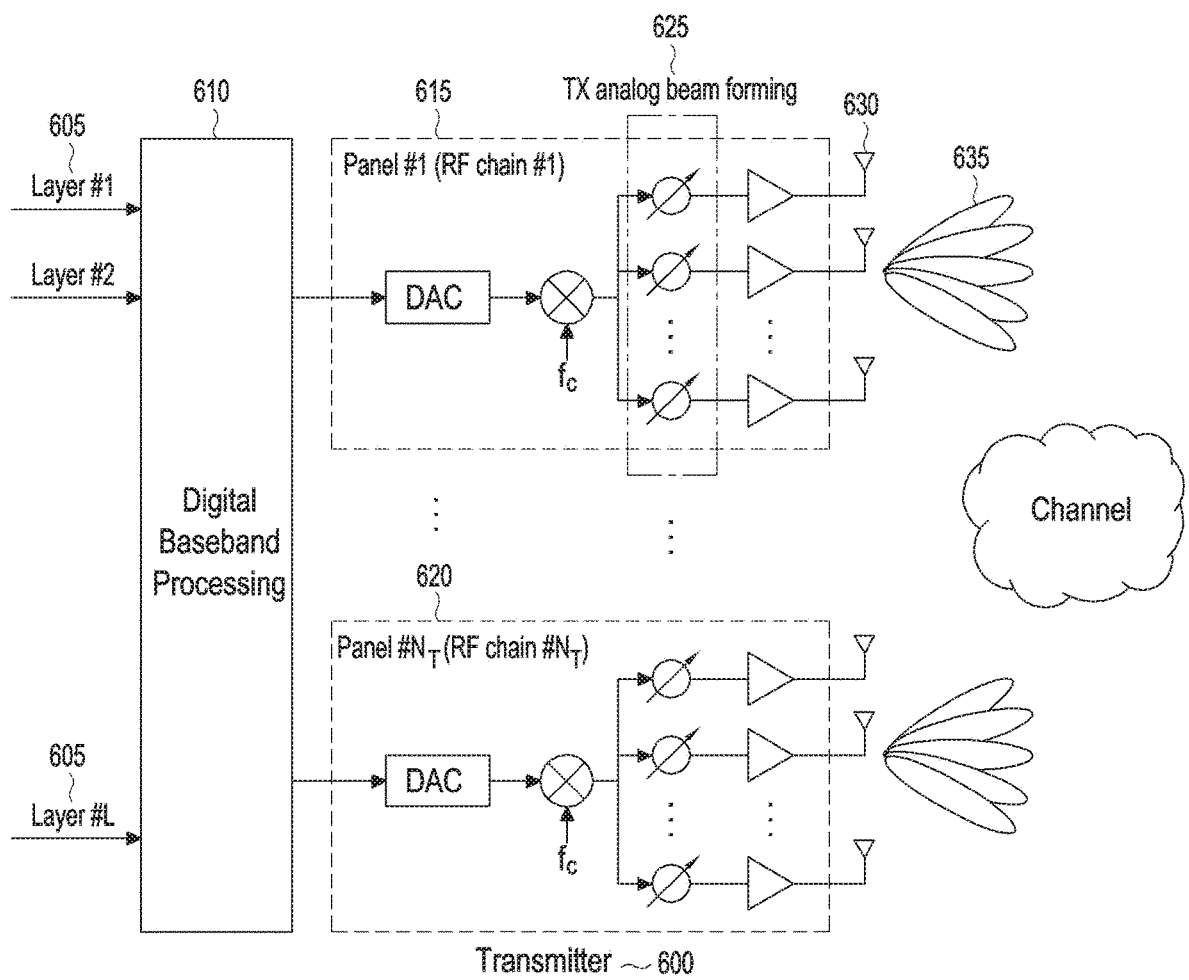
FIG. 6A is a block diagram illustrating a configuration of a transmitter supporting hybrid beamforming according to an embodiment of the disclosure.
Figure 6B:
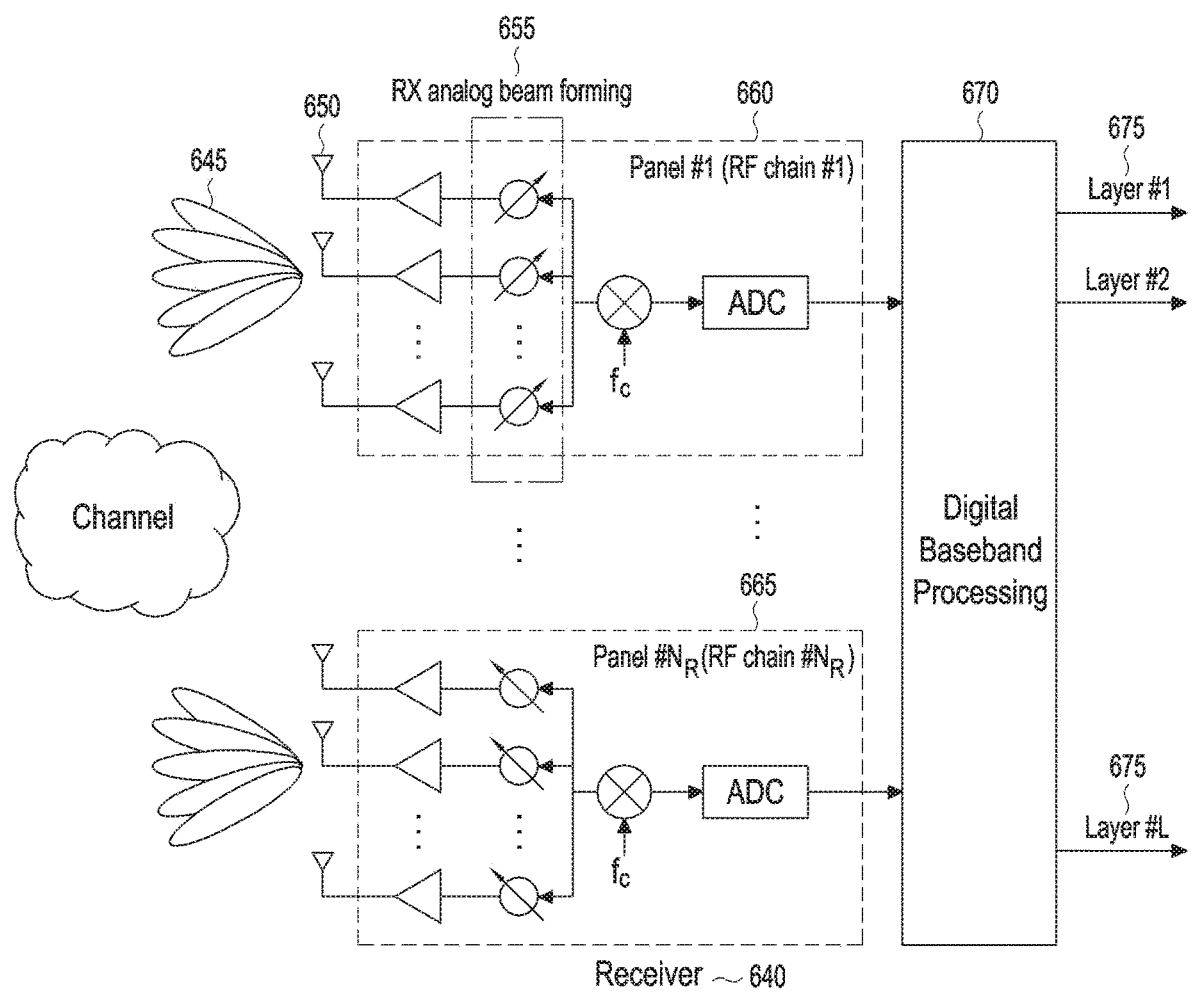
FIG. 6B is a block diagram illustrating a configuration of a receiver supporting hybrid beamforming according to an embodiment of the disclosure.

FIG. 6A is a block diagram illustrating a configuration of a transmitter supporting hybrid beamforming usable by an NR system according to an embodiment of the disclosure, and FIG. 6B is a block diagram illustrating a configuration of a receiver supporting hybrid beamforming usable by an NR system according to an embodiment of the disclosure.

Referring to FIG. 6A, in the transmitter 600, such as a BS (gNB), information of L MIMO layers 605 from layer #1 to layer #L are distributed to $N_T$ panels (or RF chains) from a panel #1 (or RF chain #1) 615 to a panel #$N_T$ (or RF chain #$N_T$) 620 through digital precoding 610 of $N_T \times L$ dimension. The digital precoding 610 is performed in a baseband. Signals distributed to the respective panels 615 and 620 are converted into analog signals by a Digital-to-Analog Converter (DAC), and the analog signals are up-converted into signals in a carrier frequency band $f_c$. The up-converted signals are formed into transmission beam(s) 635 in a particular direction through a transmission analog beamformer 625 belonging to each of the panels 615 and 620, and then are transmitted through antenna elements 630. In this example, since from the perspective of a user equipment, the antenna elements 630 of each of the panels 615 and 620 are virtualized by the transmission analog beams so as to appear to be one antenna port, the user equipment does not need to perform channel estimation for individual antenna elements.

Referring to FIG. 6B, the receiver 640, such as a user equipment, receives wireless signals from multiple reception beams 645 by using NR panels (or RF chains) 660 and 665, each of which includes multiple antenna elements 650. In this example, a reception beam in a particular direction is applied to the wireless signals, received through the antenna elements 650 of each of the panels 660 and 665, through a reception analog beamformer 655. Reception signals after reception beamforming are down-converted into signals in a baseband, and then converted into digital signals by an Analog-to-Digital Converter (ADC). The digital signals are distributed to L MIMO layers 675 from a layer #1 to a layer #L 675's, as information thereof through a digital equalizer 670 of L×N dimension.

In the above-described hybrid beamforming system, when the number of transmission panel-specific antenna elements is $K_T$ and the number of reception panel-specific antenna elements is $K_R$, a channel estimation complexity level relative to a full digital precoding system can be reduced by as much as $1/(K_T K_R)$ times.

The reduction in the channel estimation complexity level of the hybrid beamforming system is a result obtained when appropriate transmission beams or reception beams are applied by a transmission panel or a reception panel. Therefore, there is a need for technology which allows a transmitter or a receiver to acquire information on the appropriate transmission/reception beams or transmission/reception beam directions in a real environment.

In the case of a DL, transmission/reception beam directions may be determined through the following procedure.

First, the BS determines transmission beam direction candidates, and transmits multiple Synchronization Signal Blocks (SSBs) or CSI-RSs within a CSI-RS resource to the user equipment in the transmission beam direction candidates. The BS receives, from the user equipment, a report on information of a preferred SSB or a preferred CSI-RS resource index, and thus may acquire transmission beam direction information preferred by the user equipment. In this example, the BS may not explicitly notify the user equipment of direction information of transmission beam candidates. The user equipment may receive DL signals by applying different reception beams to resources to which the same transmission beam is applied, and may determine a preferred reception beam direction by comparing reception qualities of the reception beams. From the perspective of a DL, a determination of a reception beam by the user equipment may become an implementation issue by the user equipment. The user equipment may not specifically report, to the BS, information on a reception beam direction.

In contrast to the DL, in the case of a UL, since it is difficult for the user equipment to recognize all entire network situations, if the user equipment optionally determines a UL beam direction, the user equipment runs a risk of exerting a bad effect on cell transmission capacity. Accordingly, the BS may indicate, to the user equipment, an analog beam or precoding information to be used during transmission of a UL channel such as a Physical Random Access Channel (PRACH), or an RS such as an SRS. This configuration implies that the UL differs from the DL in that, for the UL, transmission/reception analog beams may be non-transparent at a reception node or a transmission node.

In the case of the UL, a Random Access Channel (RACH), an SRS, or a UL DMRS may be considered as a UL beam training signal used to determine a UL beam direction. However, the RACH and the UL DMRS do not have periodicity. Therefore, the BS may use a measurement result of an SRS to detect a preferred UL beam direction.

Hereinafter, an SRS in an LTE/LTE-A system will be described.

In LTE/LTE-A, an SRS may be configured based on the following configuration information (or a subset of the following information fields) provided through higher layer signaling.

srs-BandwidthConfig: This configures an SRS bandwidth. An SRS bandwidth signified by each code point of srs-BandwidthConfig may be determined according to a UL transmission bandwidth.

srs-SubframeConfig (or srs-ConfigIndex): This configures an SRS period and an SRS subframe offset. An SRS period and an SRS subframe offset signified by each code point of srs-SubframeConfig may be determined according to whether a duplex mode is FDD or TDD.

ackNackSRS-SimultaneousTransmission: This notifies whether to simultaneously transmit an ACK/NACK and an SRS.

srs-MaxUpPts: This notifies whether to initialize a frequency position of SRS transmission in an Uplink Pilot Time Slot (UpPTS).

srs-HoppingBandwidth: This notifies of an SRS hopping bandwidth for SRS frequency hopping.

freqDomainPosition: This notifies of the value of used to determine a frequency-domain position of SRS transmission.

duration: This notifies of a transmission duration of a periodic SRS.

transmissionComb: This notifies of a combination offset used to determine a frequency-domain start position of SRS transmission.

cyclicShift: This notifies of the value of a CS used for SRS transmission.

ted to the user equipment through SRS configuration information, and the user equipment identifies, as an SRS subframe, a subframe index satisfying $[n_s/2]\mod T_{SFC} \in \Delta_{SFC}$ by using an SRS configuration period $T_{SFC}$ and a transmission offset $\Delta_{SFC}$ shown in Table 2.

Table 3 below shows an example of values of a parameter $k_{SRS}$ used to determine a subframe index for transmission of an SRS when the length of a UpPTS in a frame for TDD is one or two symbols.

TABLE 3

| | | subframe index n | | | | | | | | | |
|---|---|---|---|---|---|---|---|---|---|---|---|
| | | 1 | | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | | 1 | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 | srs-AntennaPort: This notifies of the number of antenna ports used for SRS transmission. For LTE, 1, 2, or 4 ports may be used.

The LTE/LTE-A system supports periodic or aperiodic SRS transmission based on the configuration information.

The BS of the LTE system may designate an SRS subframe available for transmission of an SRS by the user equipment through cell-specific SRS configuration and UE-specific SRS configuration. Next, a method for transmitting an SRS in LTE will be described in more detail.

In LTE, SRS subframes may be determined in different schemes according to FDD and TDD. However, in the disclosure, a method in TDD will be described by way of example.

Table 2 below shows an example of configuration of an SRS subframe for frame structure type 2 (i.e., TDD).

TABLE 2

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 2 shows an SRS configuration period and a transmission offset according to srs-SubframeConfig transmitted as a cell-specific parameter. srs-subframeConfig is transmit- Table 4 below shows an example of a table for determining a UE-specific SRS periodicity $T_{SRS}$ and an SRS subframe offset $T_{offset}$ for TDD.

TABLE 4

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-44 | 20 | $I_{SRS}$ − 25 |
| 45-84 | 40 | $I_{SRS}$ − 45 |
| 85-164 | 80 | $I_{SRS}$ − 85 |
| 165-324 | 160 | $I_{SRS}$ − 165 |
| 325-644 | 320 | $I_{SRS}$ − 325 |
| 645-1023 | reserved | reserved |

Table 4 shows an SRS periodicity and an SRS subframe offset according to srs-ConfigIndex used for periodic SRS transmission. srs-ConfigIndex is transmitted to the user equipment through UE-specific RRC configuration. In the LTE system, a UE-specific SRS transmission subframe index may be finally determined using Table 3 and Table 4. Specifically, the user equipment may identify cell-specific SRS subframes shown in Table 2, and may determine a UE-specific SRS transmission subframe according to Table 3 and Table 4 among the identified cell-specific SRS subframes.

Table 5 below is a mapping table representing antenna ports used for different physical channels and physical signals in the LTE/LTE-A system.

TABLE 5

| Physical channel or signal | Antenna port number p as a function of the number of antenna ports configured for the respective physical channel/signal | | | |
|---|---|---|---|---|
| | Index p̃ | 1 | 2 | 4 |
| PUSCH | 0 | 10 | 20 | 40 |
| | 1 | — | 21 | 41 |
| | 2 | — | — | 42 |
| | 3 | — | — | 43 |
| SRS | 0 | 10 | 20 | 40 |
| | 1 | — | 21 | 41 |
| | 2 | — | — | 42 |
| | 3 | — | — | 43 |
| PUCCH, SPUCCH | 0 | 100 | 200 | — |
| | 1 | — | 201 | — |

Referring to Table 5, for a PUSCH and an SRS, antenna port numbers according to a given environment may be identical. For example, when the number of antenna ports is 2, for both a PUSCH and an SRS, a first antenna port number is 20, and a second antenna port number is 21. This configuration implies that a beam or precoding, which is different from a beam or precoding applied to a PUSCH, is not applied to an SRS in the LTE/LTE-A system. That is, precoding or beamforming of an SRS may not be applied.

An NR system may use additional information fields, such as activation/deactivation signaling for an SRS resource, as well as the SRS configuration information for the above-described LTE/LTE-A system, and supports periodic, semi-persistent, and aperiodic SRS transmission. According to a transmission type of an SRS (e.g., periodic, semi-persistent, or aperiodic SRS transmission), some information fields of SRS configuration information may be omitted.

Further, in contrast to LTE, in order to provide higher flexibility, the NR system may provide only UE-specific SRS configuration without applying cell-specific SRS configuration.

For periodic SRS transmission to which UE-specific SRS configuration is applied, as an example, a slot-based SRS periodicity and a slot offset, which are determined according to a higher layer parameter that can be given through RRC configuration, may be used for each user equipment. Slot-based SRS time resources, instead of an SRS subframe, may be configured for the NR system.

A reason why SRS transmission is configured based on a slot is because the NR system supports various numerologies in that a Subcarrier Spacing (SCS) of a data channel is {15, 30, 60, 120} kilohertz (kHz). Through use of a slot-based SRS periodicity due to this configuration, the BS may allocate an SRS periodicity scalable according to data numerology. Further, another characteristic of the slot-based SRS periodicity configuration is to be able to distinguish between SRS transmissions in respective symbols.

As shown in Table 3, instead of identifying one or two symbols in an UpPTS as a subframe unit, a slot-based SRS periodicity is applied. Accordingly, the NR system may allocate one, two, or four symbols for SRS transmission in one slot, and may allocate a slot-level SRS periodicity regardless of the above-described number of symbols. Further, in contrast to LTE, the NR system may additionally support an SRS periodicity of 640 slots so as to support a wider periodicity.

Figure 7:
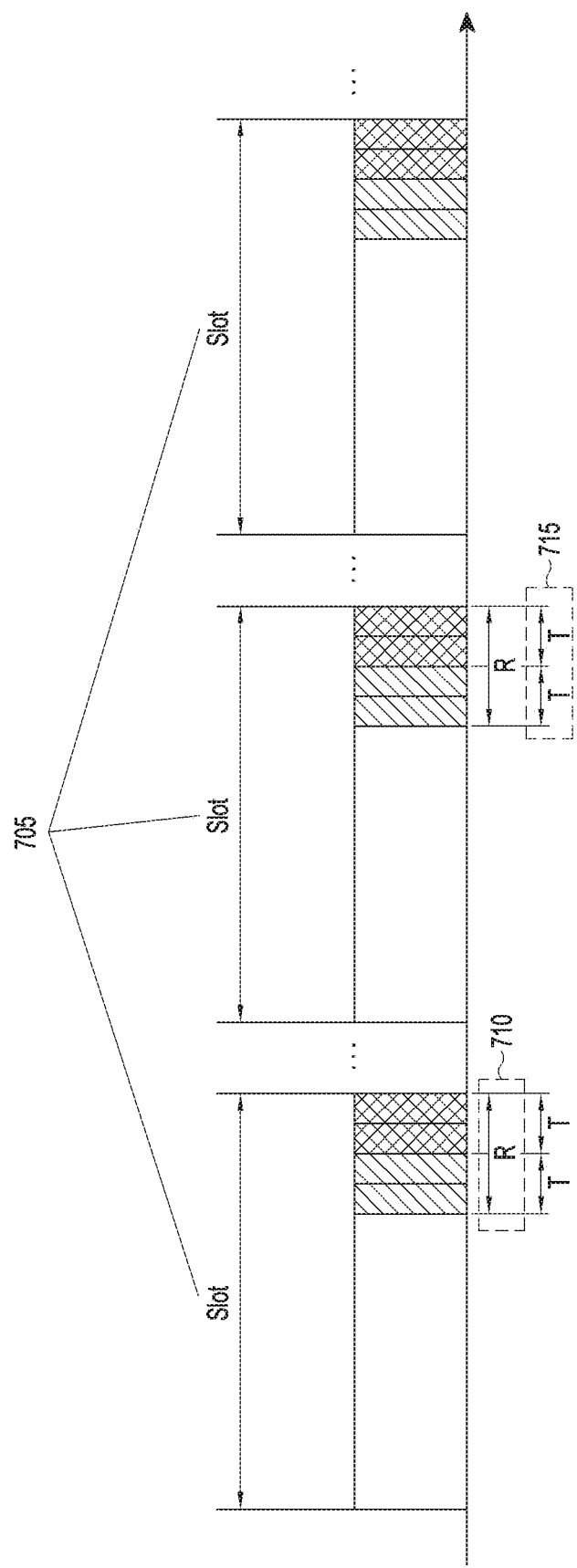
FIG. 7 is a view for explaining Sounding Reference Signal (SRS) transmission according to a slot-based periodicity in an NR system according to an embodiment of the disclosure.

FIG. 7 is a view for explaining SRS transmission according to a slot-based periodicity in an NR system according to an embodiment of the disclosure.

Referring to FIG. 7, each slot 705, in which SRS transmission occurs, is identified according to a slot-level SRS periodicity $T_{SRS}$ and a slot offset $T_{offset}$ which are given according to an SRS configuration index. In each slot 705, the number R 710 of consecutive symbols available for SRS transmission may be given as {1, 2, 4}. T symbols 715 from among the R consecutive OFDM symbols may be used for repetitive SRS transmission.

In an embodiment, the NR system may designate, for each user equipment, the same SRS configuration table for TDD and FDD in order to perform periodic SRS transmission. An SRS configuration table for TDD and FDD may include columns representing an SRS periodicity and an SRS slot offset. The NR system supports 0.5/1/2/5/10 ms as a UL/DL configuration switching periodicity, and supports 15/30/60/120 kHz as an SCS of a data channel. Accordingly, considering the number of slots which can be allocated in a UL/DL configuration switching periodicity, an SRS periodicity which becomes a multiple of 1/2/4/8/16 slots may be additionally configured.

In the NR system, the user equipment may receive one or more SRS resource sets through higher layer signaling. Each SRS resource set includes one or more SRS resources, and the maximum number of SRS resources included in each SRS resource set is determined according UE capability. According to usage, an SRS resource set may be configured as beam management, codebook, non-codebook, or antenna switching. For example, when SRS usage is configured as antenna switching, one SRS resource set may be configured for each of multiple SRS resource sets, and the number of SRS resources included in the SRS resource set may change according to an antenna switching method. SRS resources in different SRS resource sets having the same time-domain operation in the same Bandwidth Part (BWP) may be used simultaneously.

In the case of an aperiodic SRS, at least one information field within a DCI field may be used to select at least one of SRS resource sets.

SRS parameters semi-statically configured through higher layer signaling are described below.

srs-ResourceId: This indicates an identity of SRS resource configuration.

nrofSRS-Ports: This indicates the number of SRS ports.

resourceType: This indicates that SRS transmission is periodic, semi-persistent, or aperiodic.

periodicityAndOffset-p (or periodicityAndOffset-sp): This indicates a slot-level SRS periodicity and a slot offset in relation to a periodic or semi-persistent SRS resource. SRS resources in the same SRS resource set may have the same slot-level periodicity. For an aperiodically-configured SRS resource set, a slot-level option is defined by slotOffset which is a higher layer parameter.

resourceMapping: This defines the position of an OFDM symbol of an SRS resource in one slot. This may include startPosition indicating a start OFDM symbol in an SRS resource, nrofSymbols representing the number of consecutive OFDM symbols available for SRS transmission, and repetitionFactor representing the repetitive frequency of an SRS.

freqHopping: This provides parameters for SRS frequency hopping.

freqDomainPosition and freqDomainShift: These are used to determine frequency-domain positions of SRS resources.

transmissionComb: This includes parameters used to generate an SRS sequence to be transmitted on an SRS resource.

sequenceId: This represents an SRS sequence ID.

spatialRelationlnfo: This provides configuration of a spatial relation between a reference RS and a target SRS.

In an NR-MIMO system, a BS provides a user equipment with the above-described configuration information for SRS transmission in order to support hybrid beamforming. The user equipment may transmit multiple SRSs in different directions by using the configuration information. The BS may notify a user equipment of a beam direction (i.e., an SRS index), rank information, and/or transmission precoding information for a UL, which are determined based on a received SRS, and the user equipment may transmit UL transmission signal based on the information acquired from the BS.

Figure 8A:
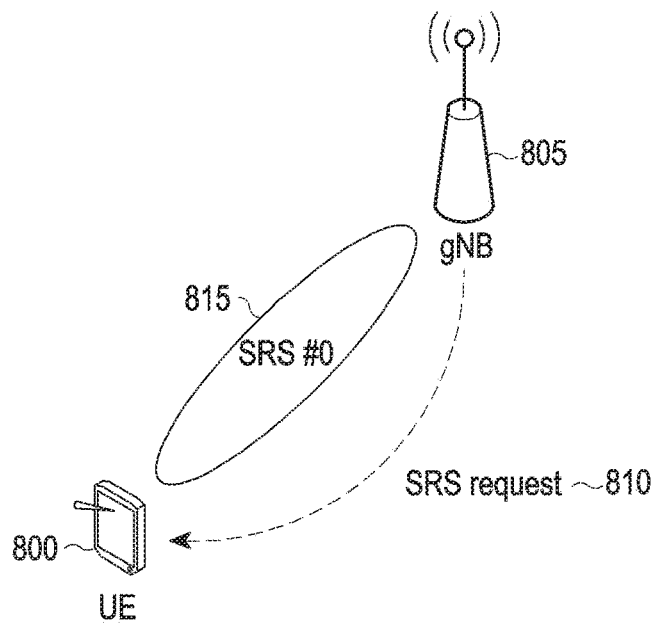
FIG. 8A is a view illustrating an example of an operating scenario of an SRS according to an embodiment of the disclosure.
Figure 8B:
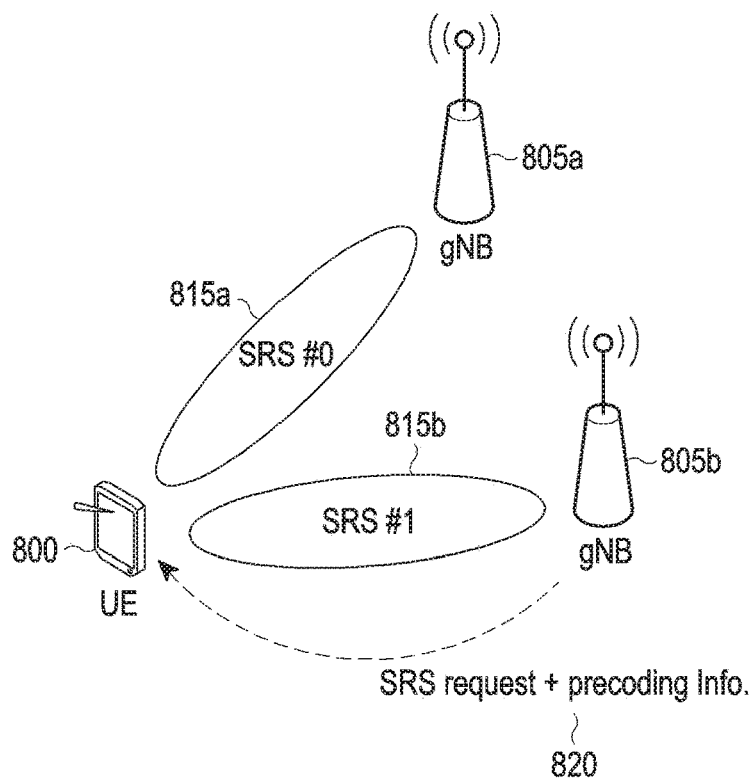
FIG. 8B is a view illustrating an example of an operating scenario of an SRS according to an embodiment of the disclosure.
Figure 8C:
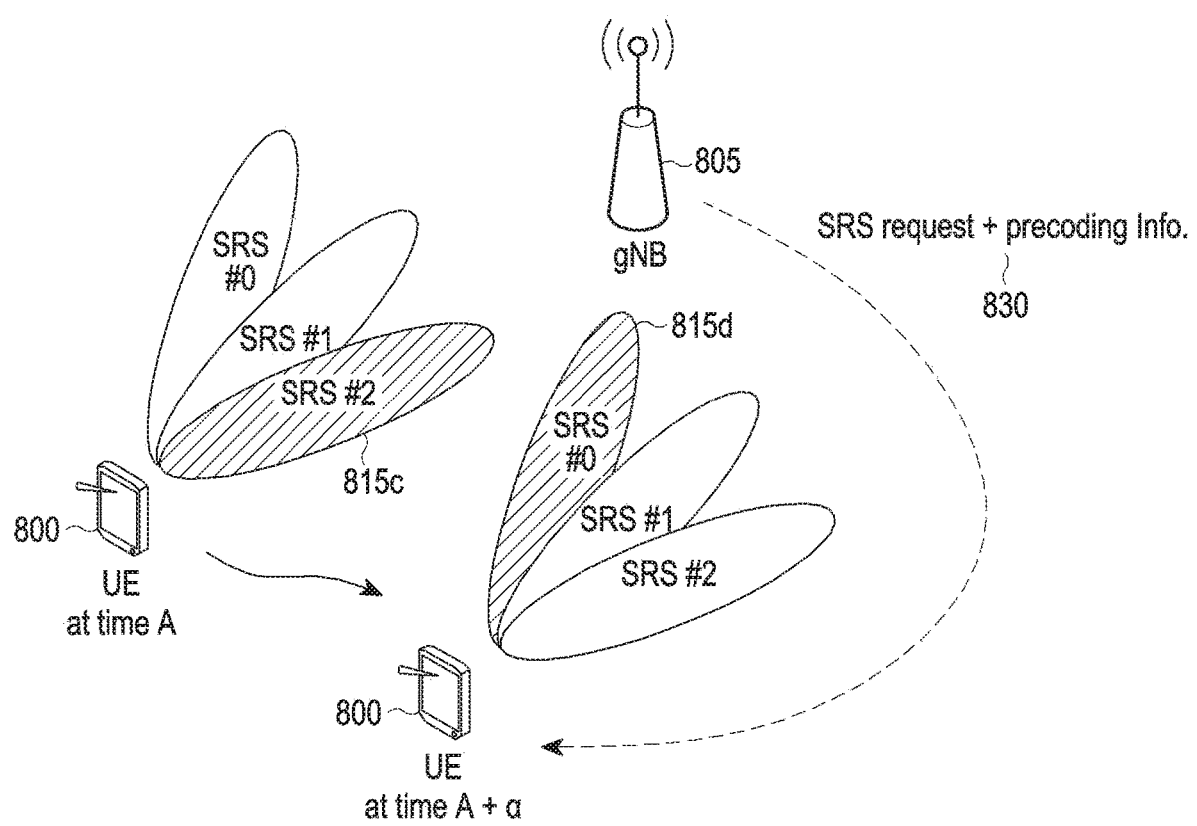
FIG. 8C is a view illustrating an example of an operating scenario of an SRS according to an embodiment of the disclosure.

FIG. 8A is a view illustrating an example of an operating scenario according to an embodiment of the disclosure, FIG. 8B is a view illustrating an example of an operating scenario according to an embodiment of the disclosure, and FIG. 8C is a view illustrating an example of an operating scenario according to an embodiment of the disclosure. The following SRS operating scenarios will be described with reference to FIGS. 8A, 8B, and 8C.

Referring to FIG. 8A, a BS 805 configures a beam in one direction for a user equipment 800. In the disclosure, configuring of a beam/precoding in one direction includes a configuration in which a beam/precoding is not applied, or a configuration in which a wide beam (cell coverage or sector coverage) is applied. The user equipment 800 transmits an SRS 815 according to an SRS periodicity and a slot offset in the case of a periodic SRS or a semi-persistent SRS, or transmits an SRS 815 at an SRS request 810 in DCI at a determined time after the SRS request is detected in the case of an aperiodic SRS. In this example, additional information for a beam/precoding is not required to transmit the SRS 815.

Referring to FIG. 8B, a BS 805b of a serving cell may configure beams in one or more directions for the user equipment 800, and the user equipment 800 may transmit multiple SRSs 815a and 815b which are beamformed in the one or more directions. For example, an SRS #0 815a may be beamformed in the direction of the BS 805a, and an SRS #1 815b may be beamformed in the direction of a BS 805b. In this example, the SRS #0 815a and the SRS #1 815b may be configured to have respective SRS resources and/or antenna ports. To this end, differently from the scenario of FIG. 8A, the BSs 805a and 805b may notify the user equipment 800 of SRS beam/precoding information as well as an SRS request, as indicated by reference numeral 820.

Referring to FIG. 8C, the BS 805 may configure one or more beams, the directions of which are different, for the user equipment 800, and the user equipment 800 may transmit multiple SRSs 815c and 815d which are beamformed in the one or more different directions. For example, the BS 805 may configure the user equipment 800 so that the user equipment 800 can transmit SRS #0, SRS #1, and SRS #2 by applying different beams/precodings to SRS #0, SRS #1, and SRS #2. Through this configuration, even when the mobility of the user equipment 800 is high, stable communication can be performed through beam/precoding diversity.

For example, the user equipment 800 may provide channel information to the BS 805 through the SRS #2 815c at a time point A, and may provide channel information to the BS 805 through the SRS #0 815d at a time point A+α. To this end, differently from the scenario of FIG. 8A, the BS 805 may notify the user equipment 800 of SRS beam/precoding information 830 as well as an SRS request.

Figure 9:
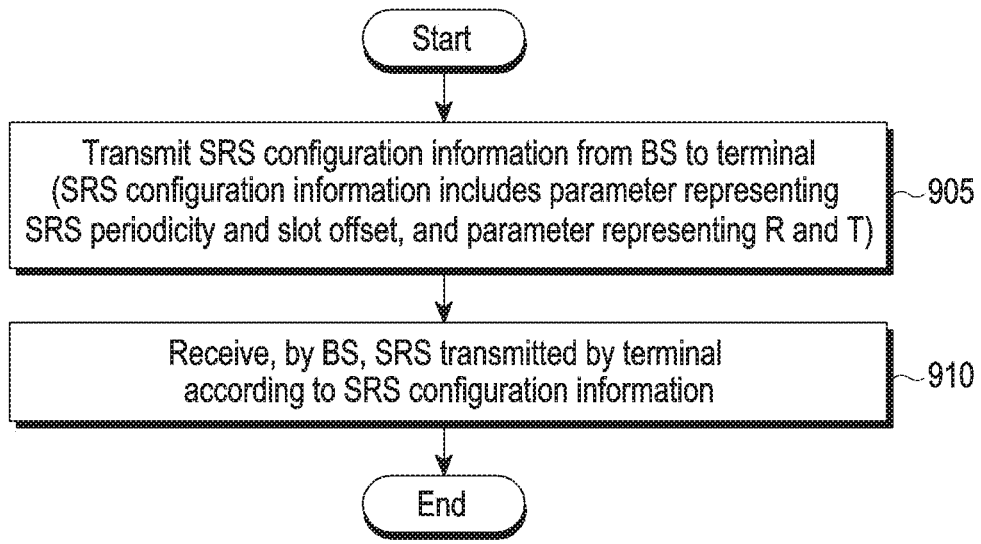
FIG. 9 is a flowchart illustrating an operating method for receiving an SRS in a wireless communication system according to an embodiment of the disclosure.
Figure 10:
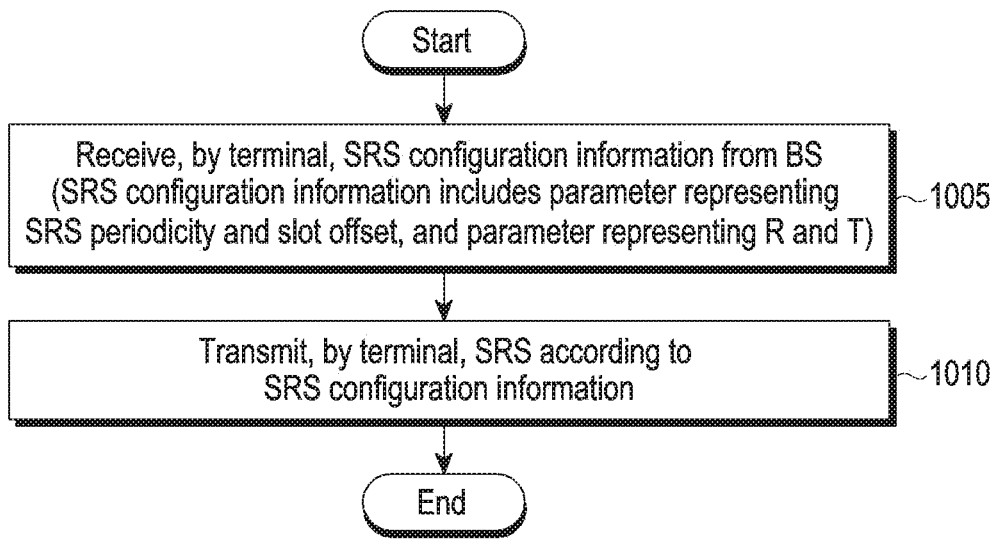
FIG. 10 is a flowchart illustrating an operating method for transmitting an SRS in a wireless communication system according to an embodiment of the disclosure.

FIG. 9 is a flowchart illustrating an operating method for receiving an SRS in a wireless communication system according to an embodiment of the disclosure, and FIG. 10 is a flowchart illustrating an operating method for transmitting an SRS in a wireless communication system according to an embodiment of the disclosure.

Referring to FIG. 9, in operation 905, a BS transmits, to a user equipment, SRS configuration information including: at least one parameter representing a slot-level SRS periodicity and a slot offset; and at least one parameter representing the number R of symbols used for SRS transmission and the number T of symbols used for repetitive transmission in each configured slot. In operation 910, the BS receives one or more SRSs transmitted by the user equipment on one or more OFDM symbols in each slot identified according to the configuration information.

Referring to FIG. 10, in operation 1005, the user equipment receives, from the BS, SRS configuration information including: at least one parameter representing a slot-level SRS periodicity and a slot offset; and at least one parameter representing the number R of symbols used for SRS transmission and the number T of symbols used for repetitive transmission in each configured slot. In operation 1010, the user equipment transmits one or more SRSs on one or more OFDM symbols in each slot identified according to the configuration information.

In the above description, SRS transmission among UL channels/signals transmitted by the user equipment has been mainly described, but a description of embodiments described below can also be applied to another UL channel/signal, such as a PRACH or a UL DMRS, similarly to the SRS transmission.

NR standards include technology supporting duplex flexibility in a paired spectrum (in the case of FDD) and an unpaired spectrum (in the case of TDD), and in particular, has been designed to use a dynamic TDD scheme. When dynamic resource allocation is allowed for each cell in a multi-cell environment, Cross Link Interference (CLI) between a UL and a DL may occur.

Figure 11:
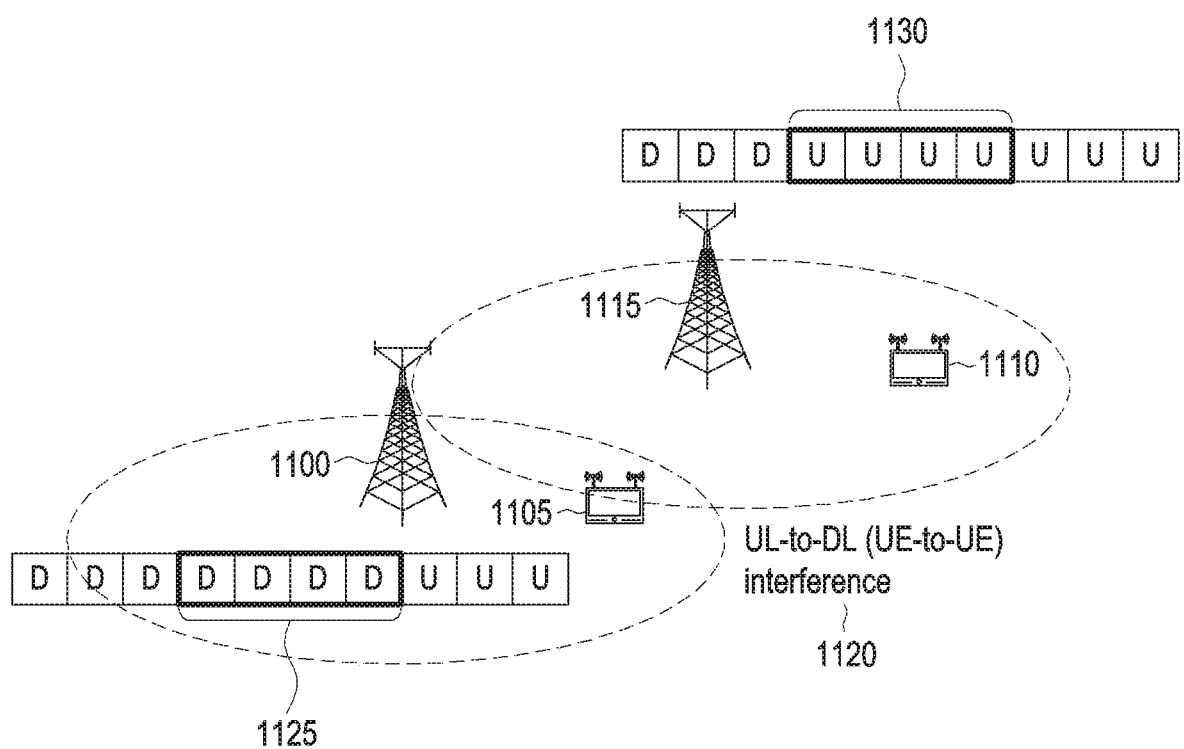
FIG. 11 is a view for explaining Cross Link Interference (CLI) occurring in a system supporting dynamic TDD according to an embodiment of the disclosure.

FIG. 11 is a view for explaining CLI occurring in a system supporting dynamic TDD according to an embodiment of the disclosure.

Referring to FIG. 11, in a system supporting dynamic TDD, time durations 1125 configured as a DL by a BS A 1100 may overlap, in a time domain, time durations 1130 configured as a UL by a BS B 1115. In this example, there occurs a case in which a UL signal (e.g., an SRS) transmitted by a user equipment B 1110 in a cell of the neighboring BS B 1115 interferes with a user equipment A 1105 which receives a DL signal in a cell of the BS A 1100, and this case is referred to as "UE-to-UE CLI" 1120. Since this UE-to-UE CLI 1120 weakens data reception quality of the user equipment A 1105, there is a need for technology for reducing the UE-to-UE CLI 1120.

In order to reduce UE-to-UE CLI, each user equipment may perform interference measurement and reporting of level 3, and the BS may perform dynamic UL/DL resource allocation based on the interference measurement and reporting from each user equipment.

Various measurement methods for measuring interference such as CLI by a user equipment may be employed. A first method corresponds to a Sounding Reference Signal Reference Signal Received Power (SRS-RSRP) scheme for measuring RSRP from an SRS, and a second method corresponds to a Cross Link Interference Received Signal Strength Indicator (CLI-RSSI) scheme for measuring received power of interference on a particular resource.

When a user equipment measures SRS-RSRP, the user equipment may receive, from a BS of a serving cell, SRS measurement configuration information similar to SRS configuration information. The user equipment may measure an SRS based on the SRS measurement configuration information, and thus acquire a measurement result of the interference.

Figure 12A:
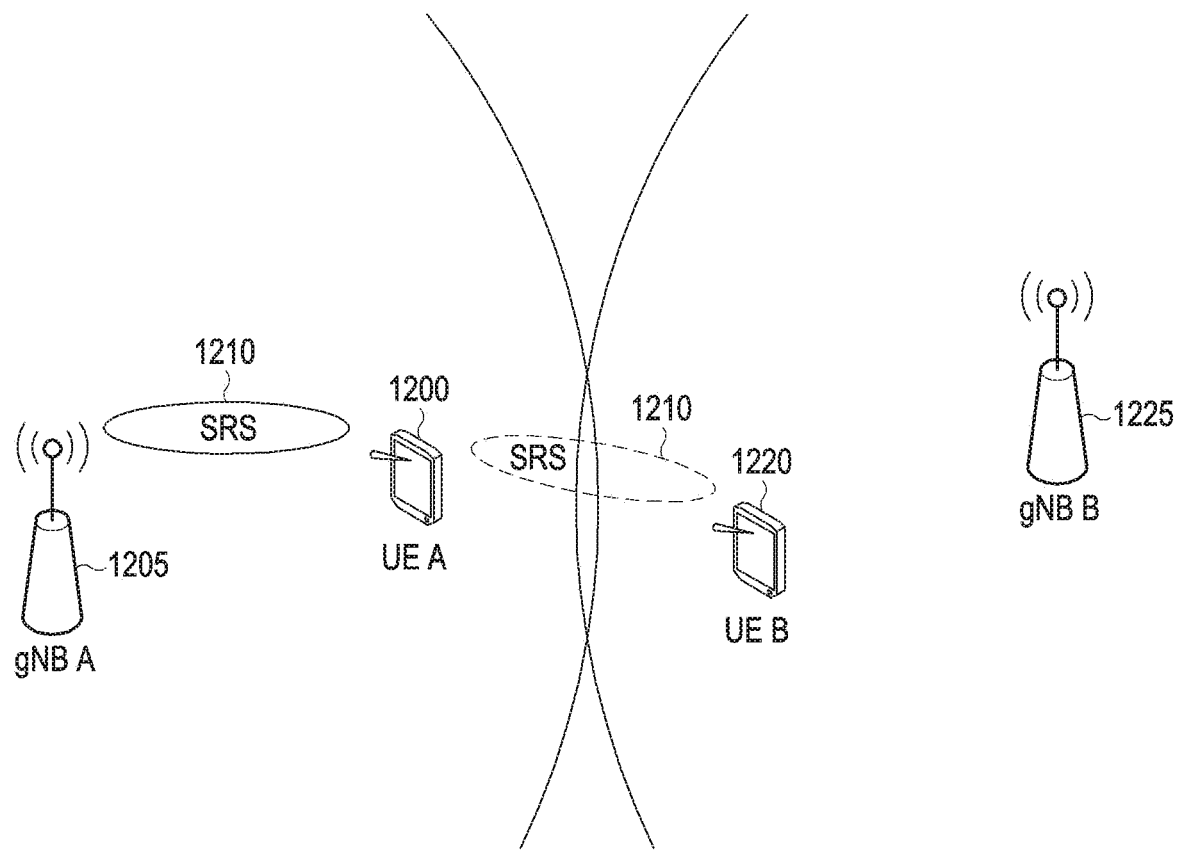
FIG. 12A is a view illustrating an SRS measurement scenario in an NR system according to an embodiment of the disclosure.
Figure 12B:
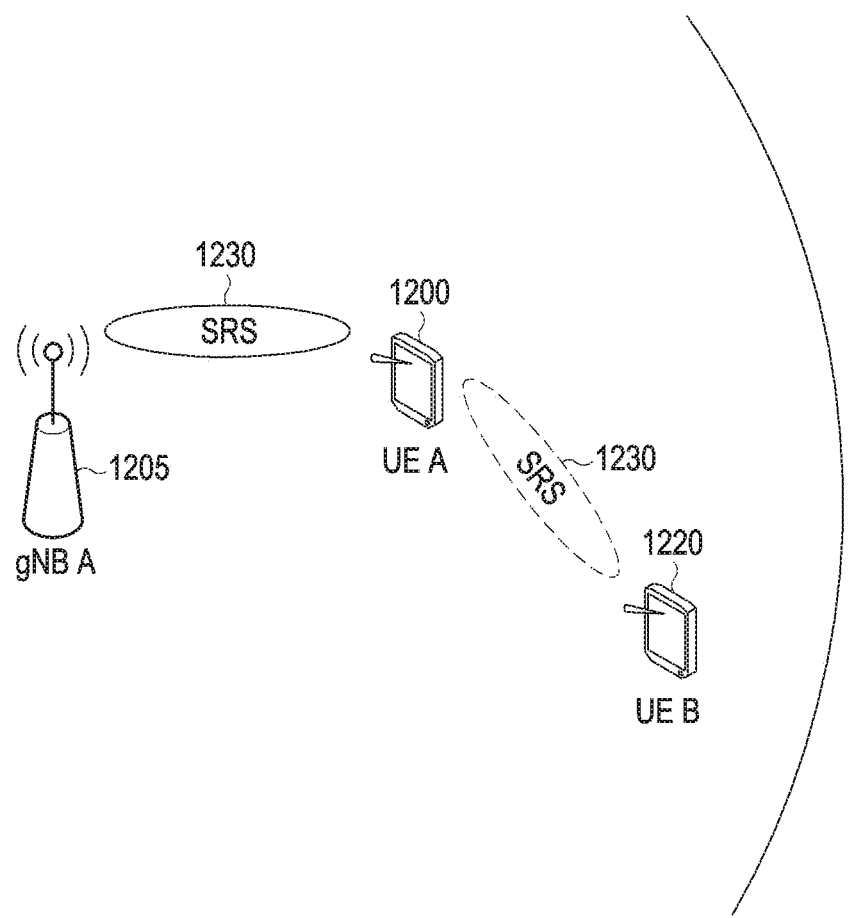
FIG. 12B is a view illustrating an SRS measurement scenario in an NR system according to an embodiment of the disclosure.

FIG. 12A is a view for explaining an SRS measurement scenario in an NR system according to an embodiment of the disclosure, and FIG. 12B is a view for explaining an SRS measurement scenario in an NR system according to an embodiment of the disclosure.

A scenario illustrated in FIG. 12A is implemented to measure an SRS between user equipments 1200 and 1220 which are located in different cells and are adjacent to each other.

Referring to FIG. 12A, in a situation where two different BSs 1205 and 1225 exist adjacent to each other, the user equipment A 1200 and the user equipment B 1220 respectively connected to the BSs 1205 and 1225 are considered. The user equipment A 1200 is connected to the BS A 1205, and the user equipment B 1220 is connected to the BS B 1225. The BS A 1205 is a serving BS of the user equipment A 1200, and the BS B 1225 is a serving base station of the user equipment B 1220. In this example, the BS A 1205 may configure, through higher layer signaling, the user equipment A 1200 to transmit an SRS 1210, or may use a physical channel signal to indicate, to the user equipment A 1200, transmission of the same, and the user equipment A 1200 may transmit the SRS 1210 in response to the configuration or indication from the BS A 1205.

The BS B 1225 may configure, through higher layer signaling, the user equipment B 1220 to measure SRS CLI, and the user equipment B 1220 may measure the SRS 1210, transmitted by the user equipment A 1200, according to SRS measurement configuration provided by the BS B 1225. The user equipment B 1220 may measure the SRS 1210, and may report a measurement result of the SRS 1210 to the BS B 1225. The BS B 1225 may provide configuration information necessary to report the measurement result, for example, parameters at least representing a transmission resource and transmission time, to the user equipment B 1220 through higher layer signaling.

A scenario illustrated in FIG. 12B is implemented to measure an SRS between the user equipments 1200 and 1220 which are located in one cell and are adjacent to each other.

Referring to FIG. 12B, the user equipment A 1200 and the user equipment B 1220 connected to the one BS 1205 are considered. The user equipment A 1200 is connected to the BS A 1205, and the user equipment B 1220 is also connected to the BS A 1205. In this example, the BS A 1205 may configure, through higher layer signaling, the user equipment A 1200 to transmit an SRS 1230, or may use a physical channel signal to indicate, to the user equipment A 1200, transmission of the same, and the user equipment A 1200 may transmit the SRS 1230 in response to the configuration or indication from the BS A 1205.

The BS A 1205 may configure, through higher layer signaling, the user equipment B 1220 to measure SRS CLI, and the user equipment B 1220 may measure the SRS 1230, transmitted by the user equipment A 1200, according to SRS measurement configuration provided by the BS A 1205. The user equipment B 1220 may measure the SRS 1230, and may report a measurement result of the SRS 1230 to the BS A 1205. The BS A 1205 may provide configuration information necessary to report the measurement result, for example, parameters at least representing a transmission resource and transmission time, to the user equipment B 1220 through higher layer signaling.

Figure 13:
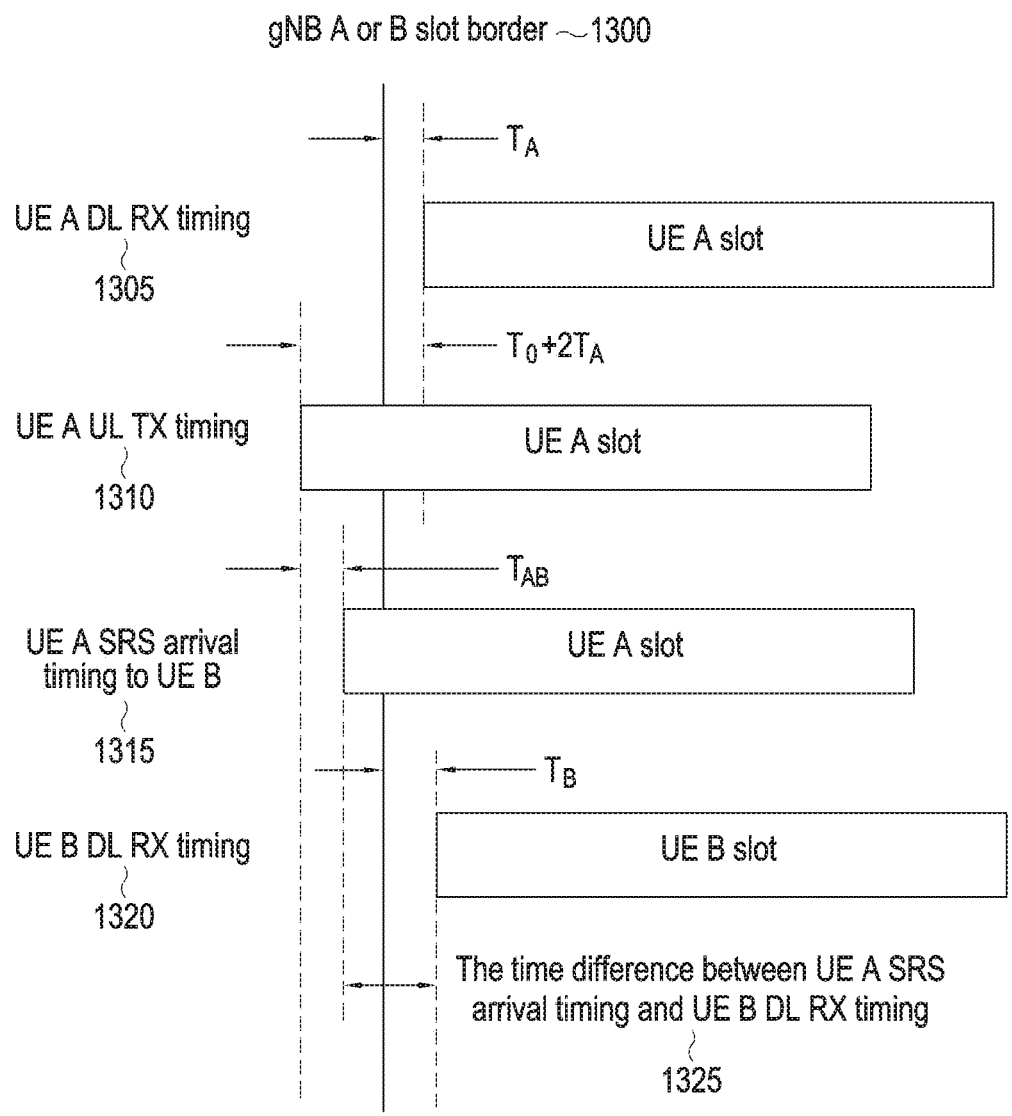
FIG. 13 is a view for explaining a situation in which a time difference between SRS transmission and SRS measurement occurs according to an embodiment of the disclosure.

FIG. 13 illustrates a situation in which there occurs a time difference between the transmission of an SRS by a user equipment and the measurement of the SRS by another user equipment which are based on the scenarios described with reference to FIGS. 12A and 12B according to an embodiment of the disclosure.

Referring to FIG. 13, a BS A or a BS B are synchronized with respect to a slot border 1300, and each of timings 1305, 1310, 1315, and 1320 may signify a start point of corresponding transmission, for example, a start point of one slot.

A DL reception (DL RX) timing 1305 of a user equipment A is described with reference to FIG. 13. In FIG. 12A, when the BS A 1205 transmits a DL signal according to the slot border 1300, the user equipment A 1200 may receive a first symbol of the DL signal after a time duration corresponding to a propagation delay between the BS A 1205 and the user equipment A 1200 from the slot border 1300 (as indicated by reference numeral 1305). For transmission timing adjustment related to the propagation delay, the BS A 1205 transmits a Timing Advance (TA) command to the user equipment A 1200 by using higher layer signaling, for example, a MAC CE. The TA command indicates TA used to adjust a TA between a DL and a UL, and TA corresponds to a propagation delay between the BS A 1205 and the user equipment A 1200. $T_A$ is a timing adjustment value used to control the amount of timing adjustment that a MAC layer entity of the user equipment A 1200 is to apply.

The user equipment A 1200 determines a UL transmission (UL TX) timing 1310 by advancing the DL RX timing 1305 by a sum $(T_0+KT_A)$ of $T_0$ and a multiple of $T_A$, from the DL RX timing 1305. In the example illustrated in FIG. 13, K is equal to 2, but K may have an integer value greater than 0. In this example, $T_0$ is $N_{TA,offset}$ and may be given by higher layer signaling or may be defined as a default value by standards. As an example, $N_{TA,offset}$ representing a TA offset used to calculate a TA between a DL and a UL of a serving cell may be included in cell-common information such as a system information block, and then be broadcast by a BS. When the user equipment does not receive information on the TA offset from the BS, the TA offset may be determined as a predetermined default value.

Further, $N_{TA}=nT_A$ representing a TA between a DL and a UL is determined from $T_A$ transmitted according to the TA command. As an example, a positive integer n may be determined based on an SCS or as a default value. As an example, when an SCS is $2^\mu \times 15$ kHz, $N_{TA}=T_A \times 16 \times 64/2^\mu$.

The user equipment A 1200 may transmit the SRS 1210, configured or indicated by the BS A 1205, with reference to the determined UL TX timing 1310. A first symbol of the SRS 1210 is received by the user equipment B 1220 at an SRS arrival timing 1315 after a propagation delay $T_{AB}$ between the user equipment A 1200 and the user equipment B 1220 from the UL TX timing 1310.

The BS B 1225 may configure, through higher layer signaling, the user equipment B 1220 to measure SRS CLI, and the user equipment B 1220 may attempt to measure the SRS 1210, transmitted by the user equipment A 1200, according to SRS measurement configuration provided by the BS B 1225. In this example, similarly to the DL RX timing 1305 of the user equipment A 1200, the user equipment B 1220 assumes that the user equipment B 1220 can receive a first symbol of a DL signal, transmitted by the BS S 1225, at a DL RX timing 1320 after a time duration corresponding to a propagation delay of itself from the slot border 1300, and performs SRS measurement at the DL RX timing 1320. Similarly to TA of the user equipment A 1200, the BS B 1225 transmits a TA command to the user equipment B 1220 by using higher layer signaling, for example, a MAC CE. The TA command indicates TA of the user equipment B 1220 (hereinafter be referred to as TB) used to adjust a TA between a DL and a UL in relation to the BS B 1225, and $T_B$ may correspond to a propagation delay between the BS B 1225 and the user equipment B 1220.

Therefore, a time difference 1325 is generated between the time point 1315, at which SRS transmission from the user equipment A 1200 arrives at the user equipment B 1220, and the time point at which the user equipment B 1220 performs SRS measurement based on SRS measurement configuration from the BS B 1225.

The time difference 1325 may be calculated as follows:
(Time difference)=$T_0+2T_A-T_{AB}+T_B-T_A=T_0+T_A-T_{AB}+T_B$.

Due to the above-described time difference, an error may be included in an SRS measurement result reported by the user equipment B 1220, and accordingly, the accuracy of dynamic resource allocation performed by the BS B 1225 may be degraded.

Hereinafter, embodiments for reducing the above-described time difference will be described.

Figure 14A:
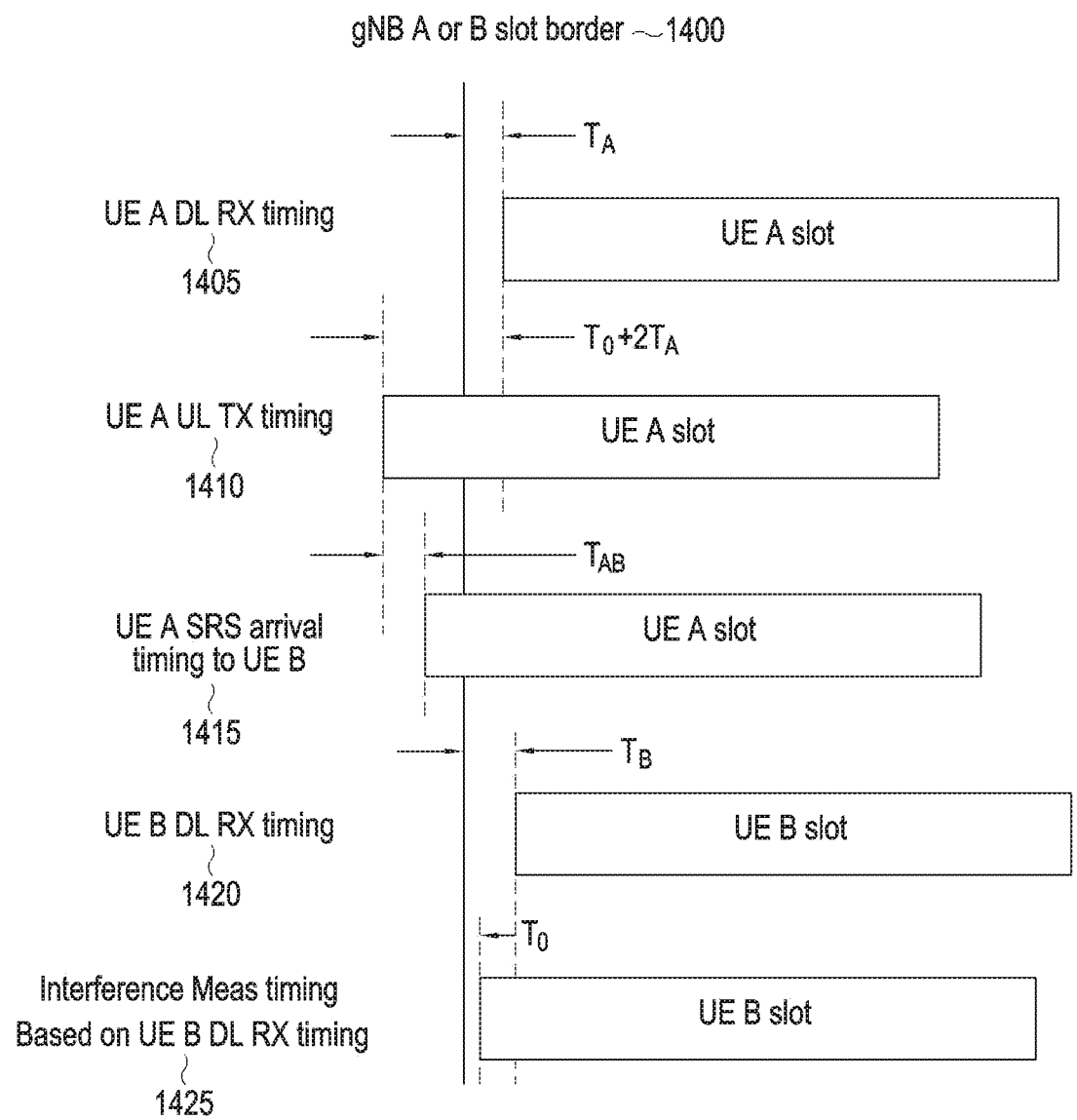
FIG. 14A is a view for explaining a scheme for determining an interference measurement timing of a user equipment with reference to a DL reception (RX) timing according to an embodiment of the disclosure.
Figure 14B:
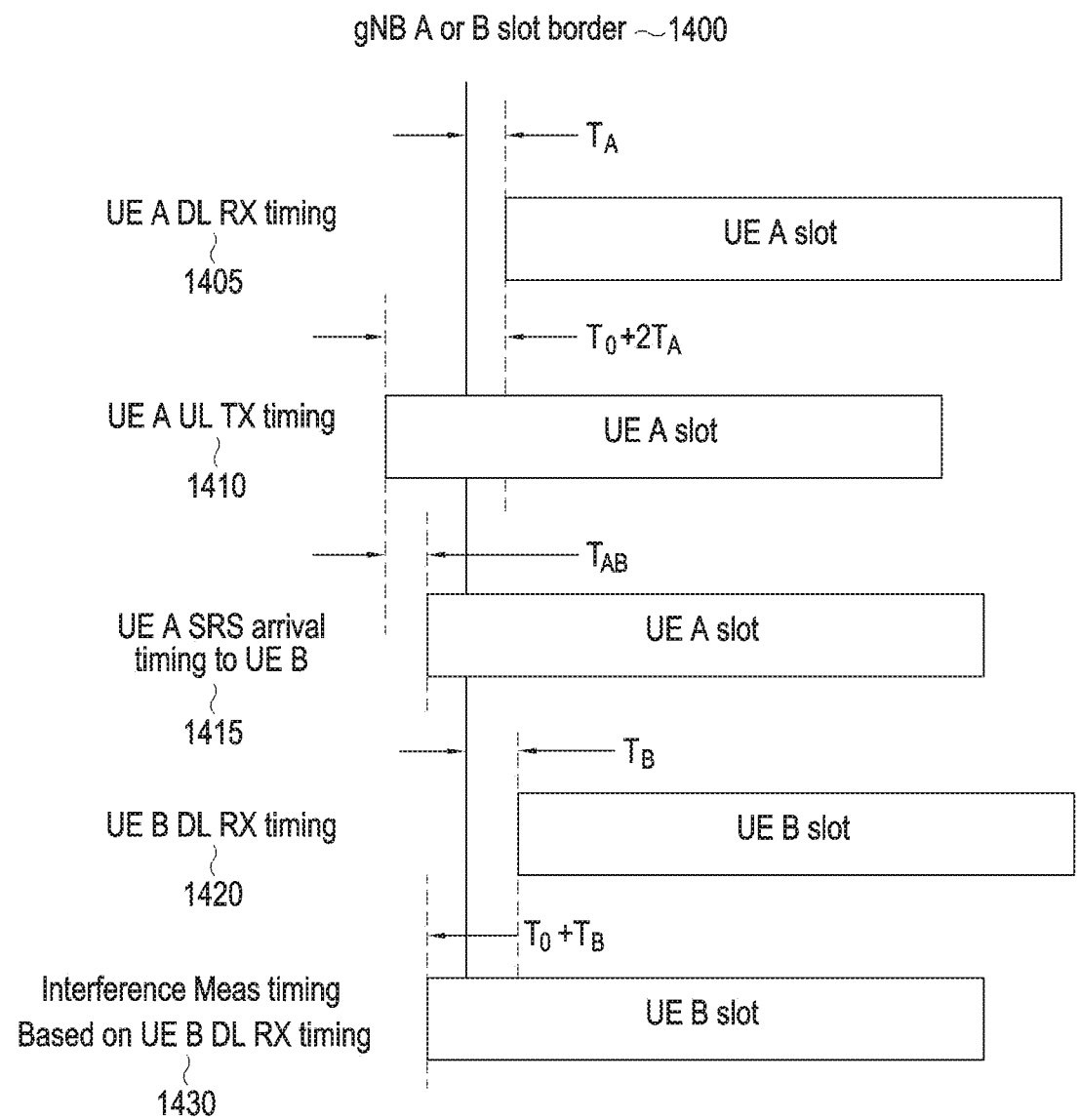
FIG. 14B is a view for explaining a scheme for determining an interference measurement timing of a user equipment with reference to a DL RX timing according to an embodiment of the disclosure.
Figure 14C:
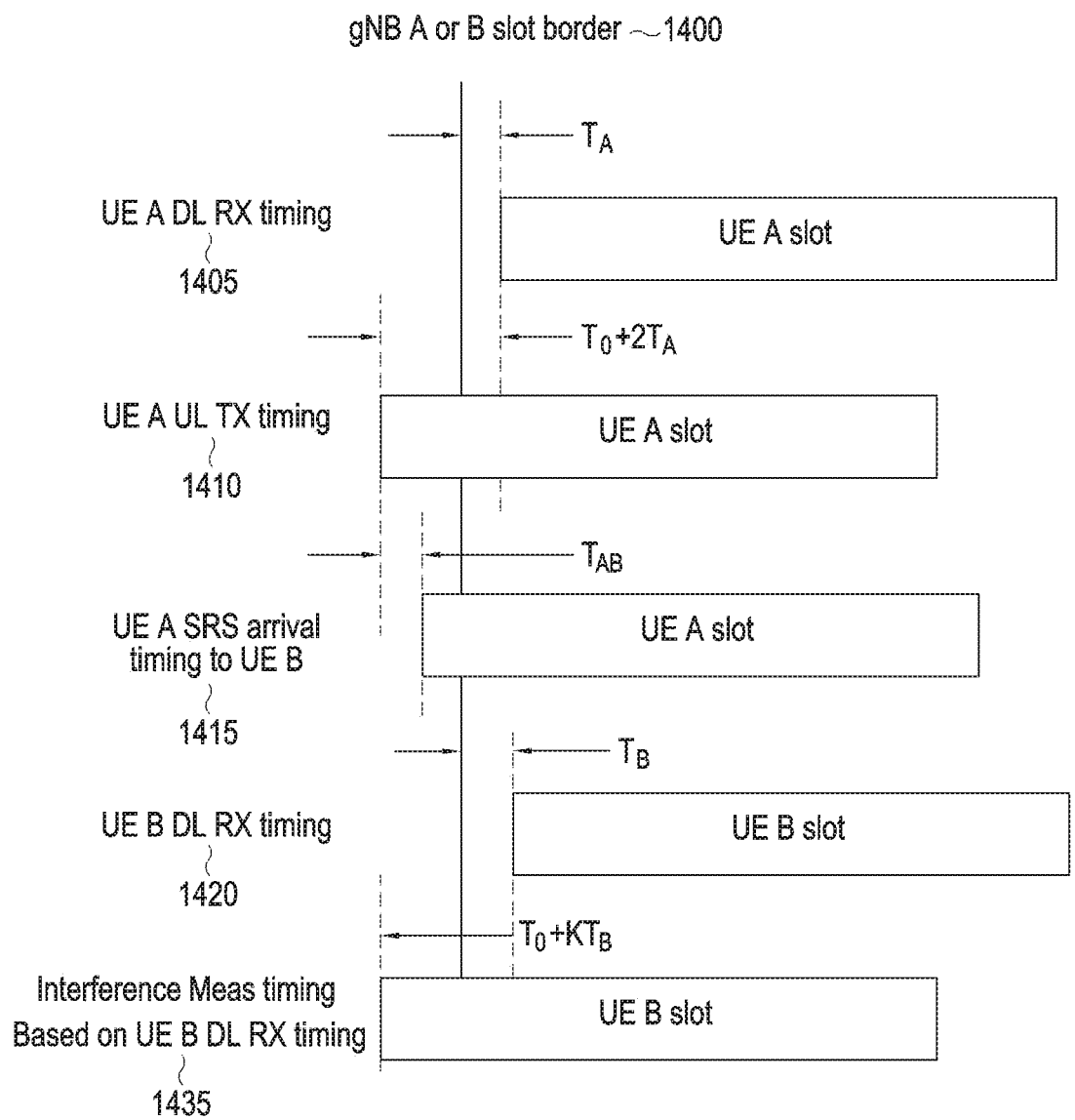
FIG. 14C is a view for explaining a scheme for determining an interference measurement timing of a user equipment with reference to a DL RX timing according to an embodiment of the disclosure.

FIG. 14A is a view for explaining a scheme for determining an interference measurement timing of a user equipment with reference to a DL RX timing according to an embodiment of the disclosure, FIG. 14B is a view for explaining a scheme for determining an interference measurement timing of a user equipment with reference to a DL RX timing according to an embodiment of the disclosure, and FIG. 14C is a view for explaining a scheme for determining an interference measurement timing of a user equipment with reference to a DL RX timing according to an embodiment of the disclosure. Hereinafter, operations of the user equipment B 1220 according to the above-described scenarios of FIG. 12A and FIG. 12B will be described, but the following description may be applied to an SRS measurement operation of any user equipment.

Referring to FIGS. 14A to 14C, embodiments are implemented to adjust interference measurement timings 1425, 1430, and 1435 related to the BS B 1225 of a serving cell based on a DL RX timing 1420 associated with the BS B 1225. The user equipment B 1220 may determine interference measurement timings 1425, 1430, and 1435 based on a DL RX timing 1420 from the BS B 1225 of a serving cell. In the following description, a description of a slot border 1400, a DL RX timing 1405 and a UL TX timing 1410 of the user equipment A 1200, and an SRS arrival timing 1415 and a DL RX timing 1420 of the user equipment B 1220 is the same as that made with reference to FIG. 13.

Referring to FIG. 14A, the user equipment B 1220 adjusts an interference measurement timing 1425 so as to be as early as a first value determined based on $T_0$, based on the DL RX timing 1420 associated with the BS B 1225. As an example, the first value is identical to $T_0$ or may be a value obtained by multiplying $T_0$ by a predetermined adjustment factor. Hereinafter, the first value will be described to be identical to $T_0$.

When the above-described interference measurement timing 1425 is applied, a time difference between the SRS arrival timing 1415 and the interference measurement timing 1425 becomes $T_A-T_{AB}+T_B$, and is less than the time difference 1325 of FIG. 13. In this example, $T_0$ is $N_{TA,offset}$ and the user equipment B 1220 may receive a value of $T_0$ through higher layer signaling from the BS B 1225, or may determine the same by making reference to a default value defined by standards. In an embodiment of FIG. 14A, when $T_0$ is greater than $T_B$ or $T_A$, the time difference may be minimized.

Referring to FIG. 14B, the user equipment B 1220 adjusts the interference measurement timing 1430 so as to be as early as the sum of a first value determined based on $T_0$ and a second value determined based on $T_B$, based on the DL RX timing 1420 from the BS B 1225. As an example, the first value may be identical to $T_0$ or may be a value obtained by multiplying $T_0$ by a predetermined adjustment factor. Further, as an example, the second value may be identical to $T_B$ or may be a value obtained by multiplying $T_B$ by a predetermined adjustment factor. Hereinafter, the first value will be described to be identical to $T_0$, and the second value will be described to be identical to $T_B$ (i.e., $T_0+T_B$).

When the above-described interference measurement timing 1430 is applied, a time difference between the SRS arrival timing 1415 and the interference measurement timing 1430 becomes $T_A-T_{AB}$. In this example, $T_0$ is $N_{TA,offset}$ and the user equipment B 1220 may receive a value of $T_0$ through higher layer signaling from the BS B 1225, or may determine the same by making reference to a default value defined by standards. Further, the user equipment B 1220 may receive a TA command, which includes an index value indicating $T_B$, through higher layer signaling from the BS B 1225, and thus may determine a value of $T_B$. In an embodiment of FIG. 14B, when $T_0+T_B$ is greater than $T_A$, the time difference may be minimized.

Referring to FIG. 14C, the user equipment B 1220 adjusts the interference measurement timing 1435 so as to be as early as $T_0+KT_B$, based on the DL RX timing 1420 from the BS B 1225. In this example, K is a predetermined adjustment factor greater than 0, and is equal to 2. When the above-described interference measurement timing 1435 is applied, a time difference between the SRS arrival timing 1415 and the interference measurement timing 1435 becomes $T_A-T_{AB}-T_B$. In this example, $T_0$ is $N_{TA,offset}$ and the user equipment B 1220 may receive a value of $T_0$ through higher layer signaling from the BS B 1225, or may determine the same by making reference to a default value defined by standards. Further, the user equipment B 1220 may receive a TA command, which includes an index value indicating $T_B$, through higher layer signaling from the BS B 1225, and thus may determine a value of $T_B$. In an embodiment of FIG. 14C, when the distance between the user equipment A 1200 and the user equipment B 1220 is relatively short and $T_B$ has a value similar to that of $T_A$, the time difference may be minimized.

Each user equipment may be configured to determine an interference measurement timing in consideration of at least one of FIGS. 14A, 14B, and 14C; determine, from a BS or another external device, an interference measurement timing in consideration of at least one of FIGS. 14A, 14B, and 14C; or select at least one of FIGS. 14A, 14B, and 14C in order to determine an interference measurement timing.

Figure 15:
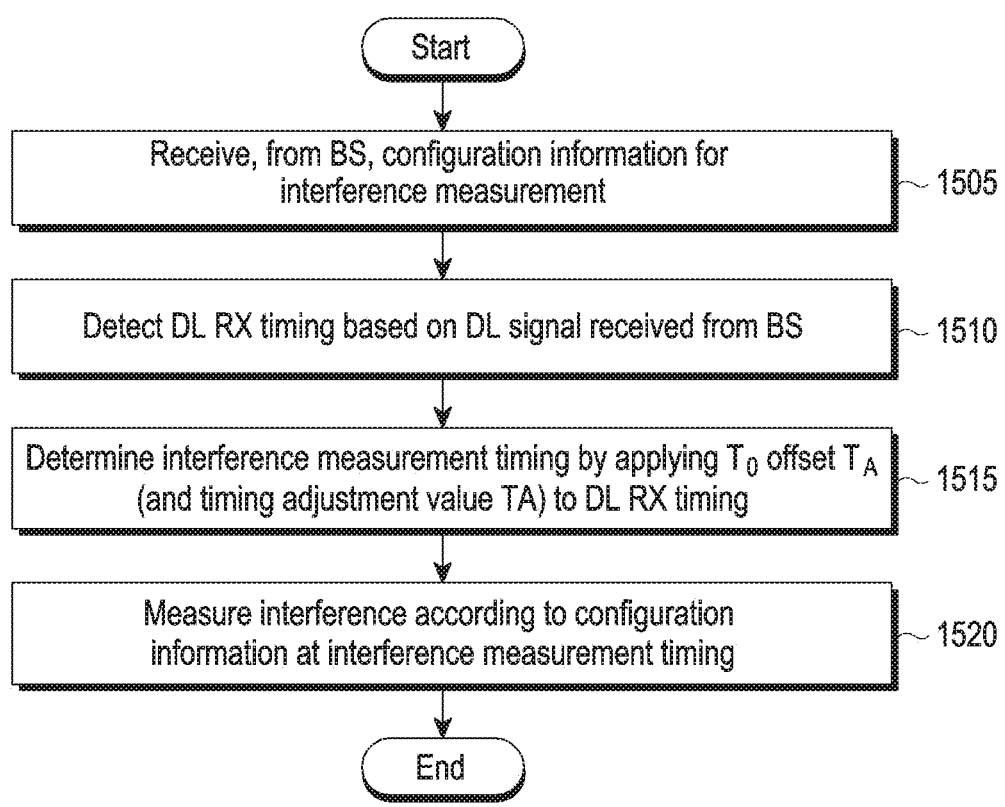
FIG. 15 is a flowchart illustrating an operation of a user equipment for performing interference measurement according to an embodiment of the disclosure.

FIG. 15 is a flowchart illustrating an operation of a user equipment for performing interference measurement according to an embodiment of the disclosure.

Referring to FIG. 15, in operation 1505, the user equipment receives configuration information for measurement of interference, such as SRS CLI, from a BS of a serving cell. As an example, the configuration information for interference measurement may be configured similarly to the above-described SRS configuration information. The user equipment may further receive configuration information for reporting of interference measurement, together with the configuration information for interference measurement. Also, simultaneously with operation 1505 or prior thereto, the user equipment may acquire, from the BS, parameters for UL-DL timing adjustment, that is, a TA offset $T_O$, a timing adjustment value $T_A$, and the like. As described above, $T_O$ may be received from the BS through higher layer signaling, for example, system information, and the value of $T_A$ may be acquired through a TA command.

In operation 1510, the user equipment detects a DL RX timing based on a DL signal received from the BS. In operation 1515, the user equipment determines an interference measurement timing by applying the TA offset $T_O$ (and the timing adjustment value $T_A$) of the serving cell to the DL RX timing. As an example, the user equipment determines the interference measurement timing by advancing the DL RX timing by one of $T_O$, $T_O+T_A$, or $T_O+2T_A$, according to one of FIGS. 14A, 14B, and 14C as described above. The interference measurement timing may be calculated by [DL RX timing—($T_O+KT_A$)]. In operation 1520, the user equipment measures interference according to the configuration information for interference measurement at the determined interference measurement timing. As an example, the user equipment may measure SRS CLI. Although not illustrated, the user equipment may report a result of the interference measurement, to the BS according to configuration information for reporting of interference measurement.

FIGS. 14A, 14B, and 14C illustrate schemes for adjusting an interference measurement timing based on a DL RX timing from a BS, but as other embodiments which may be selected or combined, an interference measurement timing may be determined based on a DL TX timing of a BS.

Figure 16A:
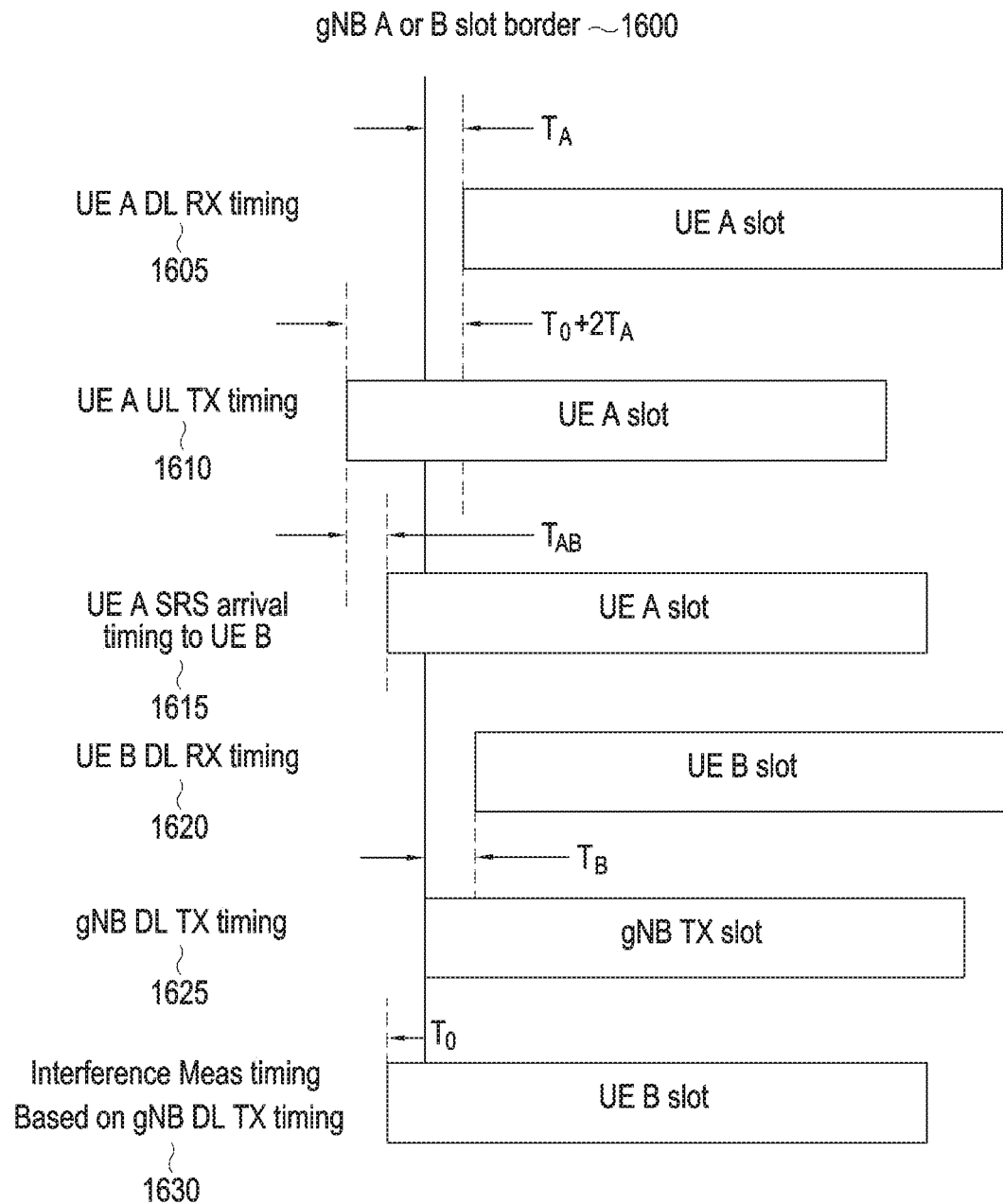
FIG. 16A is a view for explaining a scheme for determining an interference measurement timing of a user equipment with reference to a DL transmission (TX) timing according to an embodiment of the disclosure.
Figure 16B:
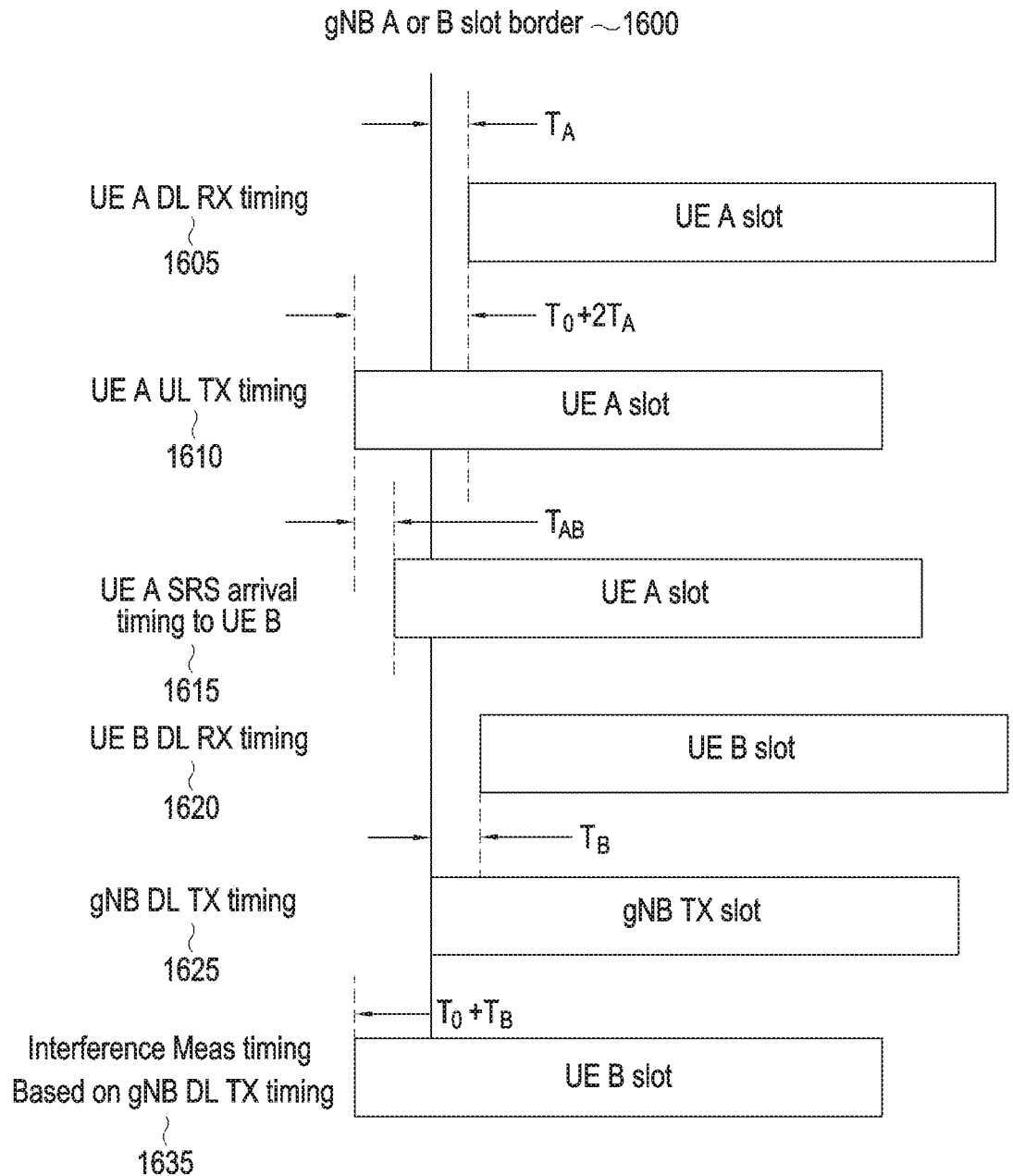
FIG. 16B is a view for explaining a scheme for determining an interference measurement timing of a user equipment with reference to a DL TX timing according to an embodiment of the disclosure.
Figure 16C:
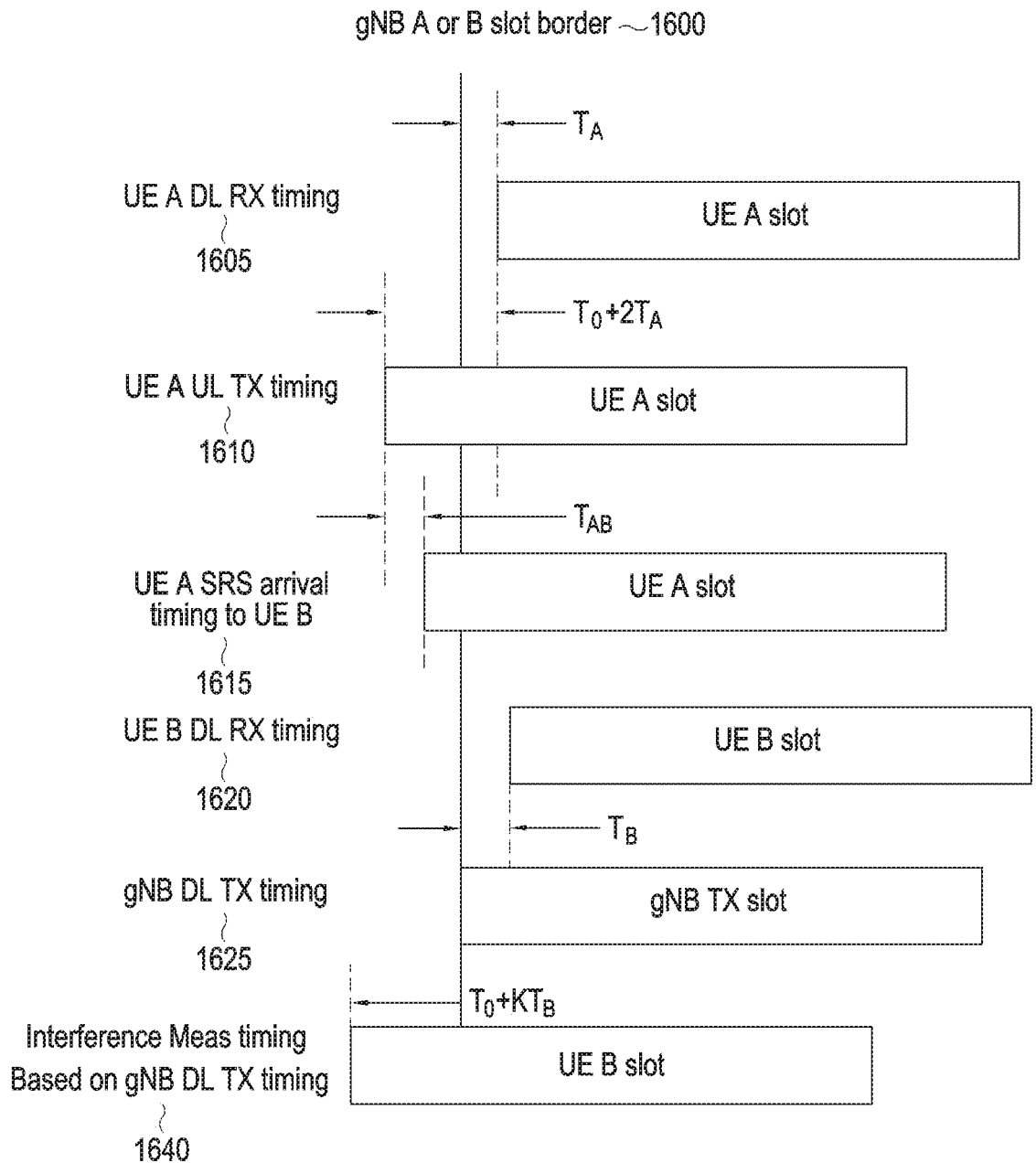
FIG. 16C is a view for explaining a scheme for determining an interference measurement timing of a user equipment with reference to a DL TX timing according to an embodiment of the disclosure.

FIG. 16A is a view for explaining a scheme for determining an interference measurement timing of a user equipment with reference to a DL TX timing according to an embodiment of the disclosure, FIG. 16B is a view for explaining a scheme for determining an interference measurement timing of a user equipment with reference to a DL TX timing according to an embodiment of the disclosure, and FIG. 16C is a view for explaining a scheme for determining an interference measurement timing of a user equipment with reference to a DL TX timing according to an embodiment of the disclosure. Hereinafter, operations of the user equipment B 1220 according to the above-described scenarios of FIGS. 12A and 12B will be described, but the following description may be applied to an SRS measurement operation of any user equipment.

Embodiments of FIGS. 16A, 16B, and 16C are implemented to adjust interference measurement timings 1630, 1635, and 1640 related to the BS B 1225 of a serving cell, based on a DL TX timing 1625 from the BS B 1225. The user equipment B 1220 may estimate a DL TX timing 1625 of the BS B 1225, and may determine interference measurement timings 1630, 1635, and 1640 based on the DL TX timing 1625. In the following description, a description of a slot border 1600, a DL RX timing 1605 and a UL TX timing 1610 of the user equipment A 1200, and an SRS arrival timing 1615 and a DL RX timing 1620 of the user equipment B 1220 is the same as that made with reference to FIG. 13.

Referring to FIG. 16A, the user equipment B 1220 estimates a DL TX timing 1625 of the BS B 1225 so as to be as early as a timing adjustment value $T_B$ acquired through a TA command from the BS B 1225, based on the DL RX timing 1620 from the BS B 1225. An interference measurement timing 1630 of the user equipment B 1220 is determined to be as early as a first value determined based on $T_O$, based on the estimated DL TX timing 1625. As an example, the first value may be identical to $T_O$, or may be a value obtained by multiplying $T_O$ by a predetermined adjustment factor. In an embodiment illustrated in FIG. 16A, the first value is identical to $T_O$.

Referring to FIG. 16B, the user equipment B 1220 estimates a DL TX timing 1625 of the BS B 1225 so as to be as early as a timing adjustment value $T_B$ acquired through a TA command from the BS B 1225, based on the DL RX timing 1620 from the BS B 1225. An interference measurement timing 1635 of the user equipment B 1220 is determined to be as early as the sum of a first value determined based on $T_O$ and a second value determined based on $T_B$, based on the estimated DL TX timing 1625. As an example, the first value may be identical to $T_O$, or may be a value obtained by multiplying $T_O$ by a predetermined adjustment factor. Further, as an example, the second value may be identical to $T_B$, or may be a value obtained by multiplying $T_B$ by a predetermined adjustment factor. In an example illustrated in FIG. 16B, the first value will be described to be identical to $T_O$, and the second value will be described to be identical to $T_B$ (i.e., $T_O+T_B$).

Referring to FIG. 16C, the user equipment B 1220 estimates a DL TX timing 1625 of the BS B 1225 so as to be as early as a timing adjustment value $T_B$ acquired through a TA command from the BS B 1225, based on the DL RX timing 1420 from the BS B 1225. An interference measurement timing 1635 of the user equipment B 1220 is determined to be as early as $T_O+KT_B$, based on the estimated DL TX timing 1625. In this example, K is a predetermined adjustment factor greater than 0, and is equal to 2 in an example illustrated in FIG. 16C.

Each user equipment may: be designed to determine an interference measurement timing in consideration of at least one of FIGS. 14A, 14B, and 14C and FIGS. 16A, 16B, and 16C; be designed to determine, from a BS or another external device, an interference measurement timing in consideration of at least one of FIGS. 14A, 14B, and 14C and FIGS. 16A, 16B, and 16C; or select at least one of FIGS. 14A, 14B, and 14C and FIGS. 16A, 16B, and 16C in order to determine an interference measurement timing.

Figure 17:
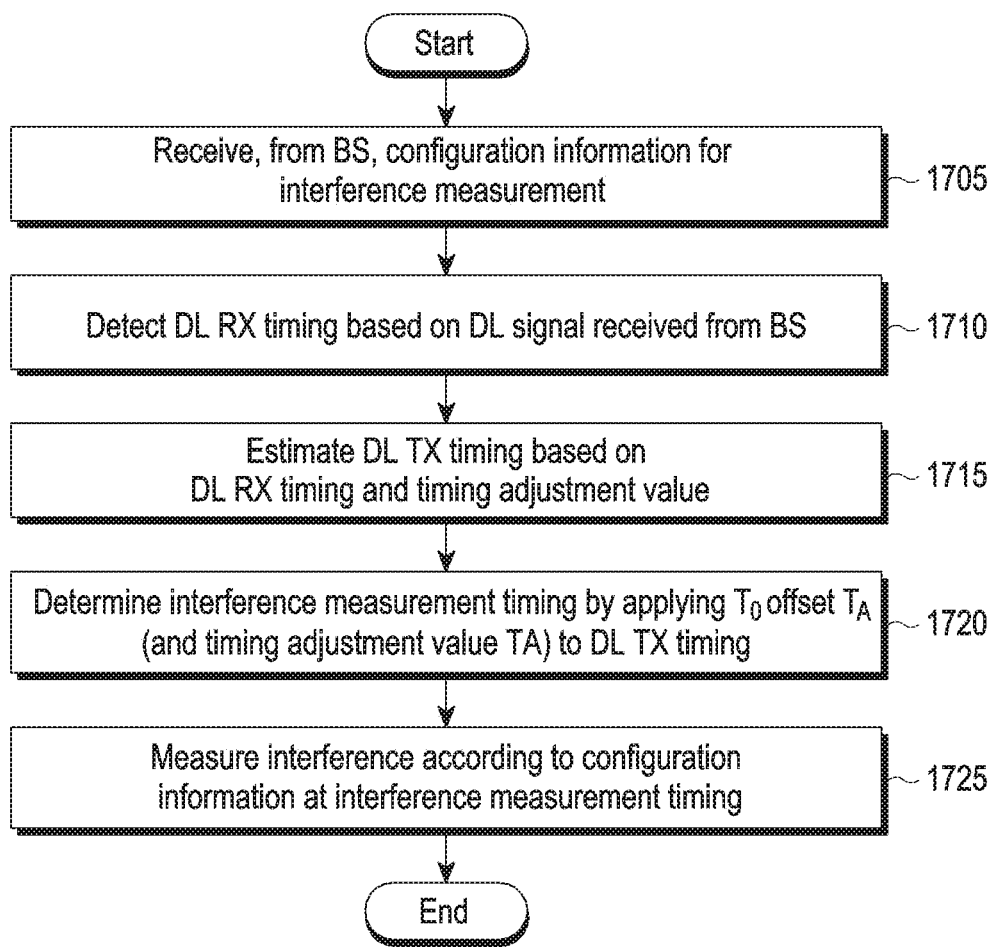
FIG. 17 is a flowchart illustrating an operation of a user equipment for performing interference measurement according to an embodiment of the disclosure.

FIG. 17 is a flowchart illustrating an operation of a user equipment for performing interference measurement according to an embodiment of the disclosure.

Referring to FIG. 17, in operation 1705, the user equipment receives configuration information for measurement of interference, such as SRS CLI, from a BS of a serving cell. As an example, the configuration information for interference measurement may be configured similarly to the above-described SRS configuration information. As an example, the user equipment may further receive configuration information for reporting of interference measurement, together with the configuration information for interference measurement. Also, simultaneously with operation 1705 or prior thereto, the user equipment may acquire, from the BS, parameters for UL-DL timing adjustment, that is, a TA offset $T_O$, a timing adjustment value $T_A$, and the like. As described above, $T_O$ may be received from the BS through higher layer signaling, for example, system information, and the value of $T_A$ may be acquired through a TA command.

In operation 1710, the user equipment detects a DL RX timing based on a DL signal received from the BS. In operation 1715, the user equipment adjusts the DL RX timing so as to be as early as the timing adjustment value TA, and thus estimates a DL TX timing of the BS. In operation 1720, the user equipment determines an interference measurement timing by applying the TA offset $T_O$ (and the timing adjustment value $T_A$) of the serving cell to the estimated DL TX timing. As an example, the user equipment determines the interference measurement timing by advancing the DL TX timing by one of $T_0$, $T_0+T_A$, or $T_0+2T_A$, according to one of FIGS. 16A, 16B, and 16C as described above. That is, the interference measurement timing may be calculated by [DL TX timing—$(T_0+KT_A)$]. In operation 1725, the user equipment measures interference according to the configuration information for interference measurement at the determined interference measurement timing. As an example, the user equipment may measure SRS CLI. Although not illustrated, the user equipment may report a result of the interference measurement, to the BS according to configuration information for reporting of interference measurement.

A determination of whether an SRS from the user equipment A 1200 can be received in a CP duration of one OFDM symbol received by the user equipment B 1220 makes it possible to recognize whether the accuracy of measurement of SRS CLI by the user equipment B 1220 can be ensured when a time difference between an SRS arrival timing and an interference measurement timing is reduced according to the above-described embodiments. In the NR system, a CP duration in one OFDM symbol occupies about 7% of the OFDM symbol. Therefore, whether a time difference reduced according to the above-described embodiments is within 7% of one OFDM symbol is determined as follows.

As an example, BS A and BS B both have a cell coverage of about 300 m, and a ratio of the reduced time difference relative to an OFDM symbol duration is shown in Table 6 below. In order to make calculation simple, it is assumed that $T_A=T_B$ and $T_{AB}=0$.

TABLE 6

|  | 15 kHz (FR1) | 30 kHz (FR1) | 60 kHz (FR2) | 120 kHz (FR2) | 240 kHz (FR2) |
| --- | --- | --- | --- | --- | --- |
| FIG. 14A | 1.4% | 2.8% | 5.6% | 11.2% | 22.4% |
| FIG. 14B | 0.7% | 1.4% | 2.8% | 5.6% | 11.2% |
| FIG. 14C (K = 2) | 0 | 0 | 0 | 0 | 0 |

As shown in Table 6, when SCSs are 15 kHz, 30 kHz, 60 kHz, 120 kHz, and 240 kHz, OFDM symbol durations are 71.36 µs, 35.67 µs, 17.84 µs, 8.916 µs, and 4.463 µs, respectively. Accordingly, it can be noted that a scheme of FIG. 14A is advantageous when SCSs are 15 kHz, 30 kHz, and 60 kHz and a scheme of FIG. 14B is advantageous when SCSs are 15 kHz, 30 kHz, 60 kHz, and 120 kHz. Therefore, it can be considered that a scheme used to determine an interference measurement timing is selected according to the value of an SCS configured for a user equipment.

Figure 18:
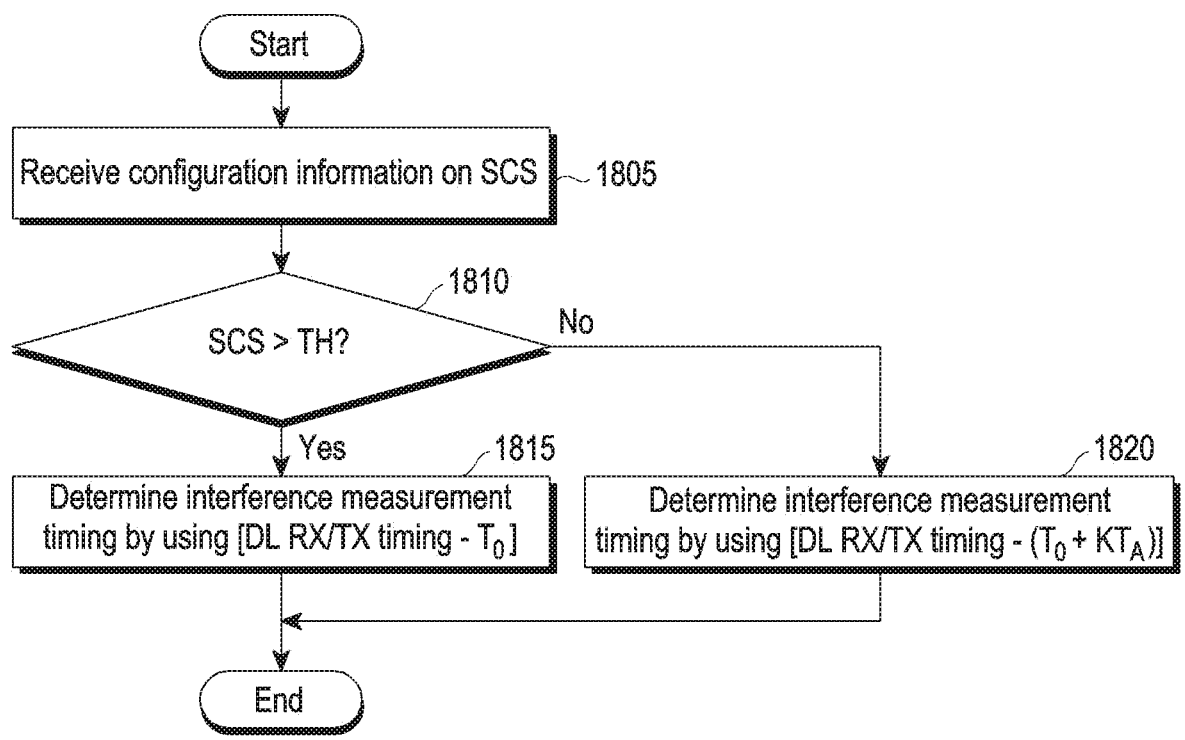
FIG. 18 is a flowchart illustrating an operation of a user equipment for determining an interference measurement timing according to an embodiment of the disclosure.

FIG. 18 is a flowchart illustrating an operation of a user equipment for determining an interference measurement timing according to an embodiment of the disclosure.

Referring to FIG. 18, in operation 1805, the user equipment receives, from a BS, configuration information on an SCS. As an example, the configuration information on an SCS may be broadcast by a BS of a serving cell in a state of being included in a Master Information Block (MIB) or a System Information Block (SIB). In operation 1810, the user equipment determines whether the SCS is greater than a predetermined threshold. As an example, the threshold may be 60 kHz or 120 kHz in Table 6.

If the SCS is greater than the threshold, the user equipment proceeds to operation 1815 and determines an interference measurement timing by adjusting a DL RX (or TX) timing so as to be as early as $T_0$ ([DL RX/TX timing—$T_0$]). In contrast, if the SCS is not greater than the threshold, the user equipment proceeds to operation 1820 and determines an interference measurement timing by adjusting the DL RX (or TX) timing so as to be as early as $T_0+KT_A$ ([DL RX/TX timing—$(T_0+KT_A)$]). In this example, K is a predetermined adjustment factor greater than 0. The interference measurement timing determined in operation 1515 or operation 1820 may be applied to operation 1520 of FIG. 15 or operation 1725 of FIG. 17.

Figure 19:
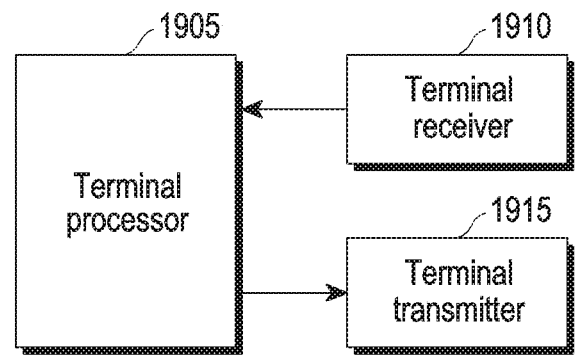
FIG. 19 is a block diagram illustrating a configuration of a user equipment according to an embodiment of the disclosure.

FIG. 19 is a block diagram illustrating a configuration of a user equipment according to an embodiment of the disclosure.

Referring to FIG. 19, a user equipment may include a user equipment receiver 1910, a user equipment transmitter 1915, and a user equipment processor 1905. The user equipment receiver 1910 and the user equipment transmitter 1915 may be collectively referred to as a "transceiver". The transceiver 1910 and 1915 may transmit or receive a wireless signal with a BS. The wireless signal may include control information and data. The transceiver 1910 and 1915 may include an RF transmitter configured to up-convert a baseband signal to be transmitted into a carrier frequency band signal and then amplify the carrier frequency band signal, and an RF receiver configured to low-noise-amplify a received wireless signal and down-convert the low-noise-amplified wireless signal into a baseband signal. Further, the transceiver 1910 and 1915 may receive a signal through a radio channel, and provide the received signal to the user equipment processor 1905, and transmit a signal, provided by the user equipment processor 1905, through the radio channel.

The user equipment processor 1905 may control a series of processes so that the user equipment can operate according to at least one or a combination of the above-described embodiments. For example, the user equipment transceiver 1910 and 1915 receives, from the BS, signals including SRS configuration information, configuration information for interference measurement, configuration information for reporting of interference measurement; and parameters for UL-DL timing adjustment (i.e., a TA offset), a timing adjustment value, and the like. The user equipment processor 1905 stores the received information. Further, the user equipment processor 1905 determines an interference measurement timing according to at least one of the above-described embodiments, and performs interference measurement based on the interference measurement timing. The user equipment transceiver 1910 and 1915 receives a signal for interference measurement according to the configuration information for interference measurement at the interference measurement timing.

Under the control of the user equipment processor 1905, the user equipment transceiver 1910 and 1915 transmits a UL RS (i.e., an SRS), according to the SRS configuration information. Further, the user equipment processor 1905 may generate a result of interference measurement of a signal received by the user equipment transceiver 1910 and 1915, and may report the result of the interference measurement to the BS through the user equipment transceiver 1910 and 1915.

Figure 20:
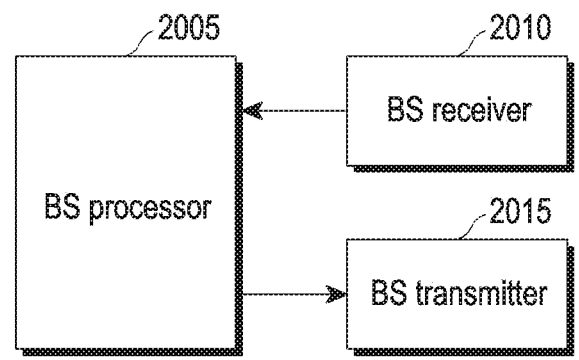
FIG. 20 is a block diagram illustrating a configuration of a BS according to an embodiment of the disclosure.

FIG. 20 is a block diagram illustrating a configuration of a BS according to an embodiment of the disclosure.

Referring to FIG. 20, a BS may include a BS receiver 2010, a BS transmitter 2015, and a BS processor 2005. The BS receiver 2010 and the BS transmitter 2015 may be collectively referred to as a "transceiver". The transceiver 2010 and 2015 may transmit or receive a wireless signal with a user equipment. The wireless signal may include control information and data. To this end, the transceiver 2010 and 2015 may include an RF transmitter configured to up-convert a baseband signal to be transmitted into a carrier frequency band signal and then amplify the carrier frequency band signal, and an RF receiver configured to low-noise-amplify a received wireless signal and down-convert the low-noise-amplified wireless signal into a base-band signal. Further, the transceiver 2010 and 2015 may receive a signal through a radio channel, provide the received signal to the BS processor 2005, and transmit a signal, provided by the BS processor 2005, through the radio channel.

The BS processor 2005 may control a series of processes so that the BS can operate according to at least one or a combination of the above-described embodiments. For example, the BS processor 2005 determines: SRS configuration information for a user equipment; configuration information for interference measurement; configuration information for reporting of interference measurement; and parameters for UL-DL timing adjustment (i.e., a TA offset, a timing adjustment value, and the like), and delivers the above-described information to the user equipment through the BS transceiver 2010 and 2015. Thereafter, under the control of the BS processor 2005, the BS transceiver 2010 and 2015 receives a result of the interference measurement, from the user equipment according to the configuration information for reporting of interference measurement. The result of the interference measurement includes a result measured at an interference measurement timing determined in at least one of the above-described embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An operating method of a user equipment in a wireless communication system, the operating method comprising:
   receiving configuration information for interference measurement, from a base station of a serving cell;
   detecting a downlink reception timing based on a downlink signal received from the base station;
   determining an interference measurement timing based on the downlink reception timing and a timing advance (TA) offset of the serving cell; and
   performing interference measurement according to the configuration information at the determined interference measurement timing.

2. The operating method of claim 1, wherein the TA offset is received from the base station, or is determined as a predetermined default value.

3. The operating method of claim 1, wherein the interference measurement timing is determined by adjusting the downlink reception timing so as to be as early as a first value determined based on the TA offset.

4. The operating method of claim 1, wherein the interference measurement timing is determined based on the downlink reception timing, the TA offset, and a timing adjustment value for a TA provided by the base station.

5. The operating method of claim 4, wherein the timing adjustment value is acquired from a TA command received from the base station.

6. The operating method of claim 1, wherein the interference measurement timing is determined by adjusting the downlink reception timing so as to be as early as a sum of a first value determined based on the TA offset, and a second value determined based on a timing adjustment value for a TA provided by the base station.

7. The operating method of claim 1, wherein the determining of the interference measurement timing comprises:
   estimating an uplink transmission timing of the base station based on the downlink reception timing; and
   determining the interference measurement timing by applying the TA offset to the uplink transmission timing.

8. The operating method of claim 7, wherein the interference measurement timing is determined by adjusting a downlink transmission timing so as to be as early as a first value determined based on the TA offset.

9. The operating method of claim 7, wherein the interference measurement timing is determined by adjusting the downlink transmission timing so as to be as early as a sum of a first value determined based on the TA offset, and a second value determined based on a timing adjustment value for a TA provided by the base station.

10. The operating method of claim 9, wherein the timing adjustment value is acquired from a TA command received from the base station.

11. An apparatus of a user equipment in a wireless communication system, the apparatus comprising:
    a transceiver, and
    a processor coupled with the transceiver and configured to:
    receive configuration information for interference measurement through the transceiver from a base station of a serving cell,
    detect, through the transceiver, a downlink reception timing based on a downlink signal received from the base station,
    determine an interference measurement timing based on the downlink reception timing and a timing advance (TA) offset of the serving cell, and
    perform interference measurement according to the configuration information at the determined interference measurement timing.

12. The apparatus of claim 11, wherein the TA offset is received from the base station, or is determined as a predetermined default value.

13. The apparatus of claim 11, wherein the interference measurement timing is determined by adjusting the downlink reception timing so as to be as early as a first value determined based on the TA offset.

14. The apparatus of claim 11, wherein the interference measurement timing is determined based on the downlink reception timing, the TA offset, and a timing adjustment value for a TA provided by the base station.

15. The apparatus of claim 14, wherein the timing adjustment value is acquired from a TA command received from the base station.

16. The apparatus of claim 11, wherein the interference measurement timing is determined by adjusting the downlink reception timing so as to be as early as a sum of: a first value determined based on the TA offset; and a second value determined based on a timing adjustment value for a TA provided by the base station.

17. The apparatus of claim 11, wherein the processor is further configured to:
    estimate an uplink transmission timing of the base station based on the downlink reception timing, and
    determine the interference measurement timing by applying the TA offset to the uplink transmission timing.

18. The apparatus of claim 17, wherein the interference measurement timing is determined by adjusting the downlink transmission timing so as to be as early as a first value determined based on the TA offset.

19. The apparatus of claim 17, wherein the interference measurement timing is determined by adjusting the downlink transmission timing so as to be as early as a sum of a first value determined based on the TA offset, and a second value determined based on a timing adjustment value for a TA provided by the base station.

20. The apparatus of claim 19, wherein the timing adjustment value is acquired from a TA command received from the base station.

21. The apparatus of claim 18, wherein the first value is determined by multiplying the TA offset by a predetermined adjustment factor.

22. The apparatus of claim 19,
wherein the first value is determined by multiplying the TA offset by a first predetermined adjustment factor, and
wherein the second value is determined by multiplying the timing adjustment value by a second predetermined adjustment factor.

23. The apparatus of claim 22, wherein the second predetermined adjustment factor is two.

* * * * *